US011767468B2

(12) United States Patent
Sava Gallis et al.

(10) Patent No.: US 11,767,468 B2
(45) Date of Patent: Sep. 26, 2023

(54) OPTICAL TAGS COMPRISING RARE EARTH METAL-ORGANIC FRAMEWORKS

(71) Applicant: National Technology & Engineering Solutions of Sandia, LLC, Albuquerque, NM (US)

(72) Inventors: Dorina F. Sava Gallis, Albuquerque, NM (US); Kimberly Butler, Albuquerque, NM (US); Lauren E. S. Rohwer, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 205 days.

(21) Appl. No.: 17/479,710

(22) Filed: Sep. 20, 2021

(65) Prior Publication Data
US 2022/0106522 A1 Apr. 7, 2022

Related U.S. Application Data

(60) Provisional application No. 63/086,419, filed on Oct. 1, 2020.

(51) Int. Cl.
C09K 11/06 (2006.01)
C07F 5/00 (2006.01)
G01N 21/64 (2006.01)
(52) U.S. Cl.
CPC .............. *C09K 11/06* (2013.01); *C07F 5/003* (2013.01); *G01N 21/6428* (2013.01);
(Continued)

(58) Field of Classification Search
CPC ...... C09K 11/06; C07F 5/003; G01N 21/6428
See application file for complete search history.

(56) References Cited

U.S. PATENT DOCUMENTS 9,741,945 B1 * 8/2017 Nenoff ................ H10K 85/321
2005/0178841 A1 * 8/2005 Jones, II ................ G06K 7/12
235/491

(Continued)

OTHER PUBLICATIONS

Deneff, J. I. et al., "Encoding Multilayer Complexity in Anti-Counterfeiting Heterometallic MOF-Based Optical Tags," Angewandte Chemie International Edition, 2021, vol. 60, pp. 1203-1211.
(Continued)

*Primary Examiner* — Hugh Maupin
(74) *Attorney, Agent, or Firm* — Kevin W. Bieg

(57) ABSTRACT

Optical tags provide a way to identify assets quickly and unambiguously, an application relevant to anti-counterfeiting and protection of valuable resources or information. The present invention is directed to a tag fluorophore that encodes multilayer complexity in a family of heterometallic rare-earth metal-organic frameworks (RE-MOFs) based on highly connected polynuclear clusters and carboxylic acid-based linkers. Both overt (visible) and covert (near infrared, NIR) properties with concomitant multi-emissive spectra and tunable luminescence lifetimes impart both intricacy and security. Tag authentication can be validated with a variety of orthogonal detection methodologies. The relationships between structure, composition, and optical properties of the family of RE-MOFs can be used to create a large library of rationally designed, highly complex, difficult to counterfeit optical tags.

24 Claims, 22 Drawing Sheets

(52) U.S. Cl.
CPC .... *C09K 2211/10* (2013.01); *C09K 2211/182* (2013.01); *G01N 2021/6439* (2013.01)

(56) References Cited

U.S. PATENT DOCUMENTS

2005/0208543 A1* 9/2005 Vann .................. B82Y 5/00
435/6.12
2013/0280611 A1* 10/2013 Alkordi ................ H01M 50/411
429/246

OTHER PUBLICATIONS

Ren, W. et al., "Optical Nanomaterials and Enabling Technologies for High-Security-Level Anticounterfeiting," Advanced Materials, 2020, vol. 32, 1901430, 15 pages.
Armelao, L. et al., "Design of Luminescent Lanthanide Complexes: From Molecules to Highly Efficient Photo-Emitting Materials," Coordination Chemistry Reviews, 2010, vol. 254, pp. 487-505.
White, K. A. et al., "Near-Infrared Luminescent Lanthanide MOF Barcodes," J. Am. Chem. Soc. 2009, vol. 131, pp. 18069-18071.
Zhang, Q. et al., "Multicolor Upconverted Luminescence-encoded Superparticles via Controlling Self-Assembly Based on Hydrophobic Lanthanide-Doped $NaYF_4$ Nanocrystals," Journal of Material Chemistry, 2011, 21, pp. 12132-12138.
Xin, L-y., et al., "Two Series of Lanthanide Coordinated Compounds and Novel Three-Component Near-White Light Emission," Journal of Inorganic and Organometallic Polymers and Materials, 2020, vol. 30, pp. 1790-1797.
Wang, J. et al., "Multi-Emissive Lanthanide-Based Coordination Polymers for Potential Application as Luminescent Bar-Codes," Inorganic Chemistry, 2019, vol. 58, pp. 2659-2668.
Gorris, H. H. et al., "Tuning the Dual Emission of Photon-Upconverting Nanoparticles for Ratiometric Multiplexed Encoding," Advanced Materials, 2011, vol. 23, pp. 1652-1655.
Kalytchuk, S. et al., "Carbon Dot Fluorescence-Lifetime-Encoded Anti-Counterfeiting," ACS Applied Materials and Interfaces, 2018, vol. 10, pp. 29902-29908.
Jiang, K. et al., "Triple-Mode Emission of Carbon Dots: Applications for Advanced Anti-Counterfeiting," Angewandte Chemie International Edition, 2016, vol. 55, pp. 7231-7235.
Alezi, D. et al., "Quest for Highly Connected Metal-Organic Framework Platforms: Rare-Earth Polynuclear Clusters Versatility Meets Net Topology Needs," J. Am. Chem. Soc., 2015, vol. 137, pp. 5421-5430.
Abdulhalim, R. G. et al., "A Fine-Tuned Metal-Organic Framework for Autonomous Indoor Moisture Control," J. Am. Chem. Soc., 2017, vol. 139, pp. 10715-10722.
Xue, D-X. et al., "Tunable Rare-Earth fcu-MOFs: A Platform for Systematic Enhancement of $CO_2$ Adsorption Energetics and Uptake," J. Am. Chem. Soc., 2013, vol. 135, pp. 7660-7667.
Luebke, R. et al., "Versatile Rare earth Hexanuclear Clusters for the Design and Synthesis of Highly-Connected ftw-MOFs," Chemical Science, 2015, vol. 6, pp. 4095-4102.
Guillerm, V. et al., "Discovery and Introduction of a (3,18)-Connected Net as an Ideal Blueprint for the Design of Metal-Organic Frameworks," Nature Chemistry, 2014, vol. 6, pp. 673-680.
Guillou, O. et al., "A Long Journey in Lanthanide Chemistry: From Fundamental Crystallogenesis Studies to Commercial Anticounterfeiting Taggants," Accounts of Chemical Research, 2016, vol. 49, pp. 844-856.
Sava Gallis, D. F. et al., "Multifunctional, Tunable Metal-Organic Framework Materials Platform for Bioimaging Applications," ACS Applied Materials & Interfaces, 2017, vol. 9, pp. 22268-22277.
Cui, Y, et al., "Luminescent Functional Metal-Organics Frameworks," Chemical Reviews, 2012, vol. 112, pp. 1126-1162.
Castells-Gil, J. et al., "Electronic, Structural and Functional Versatility in Tetrathiafulvalene-Lanthanide Metal-Organic Frameworks," Chem. Eur. J., 2019, vol. 25, pp. 12636-2643.
Tanase, S. et al., "A Facile Building-Block Synthesis of Multifunctional Lanthanide MOFs," Journal of Materials Chemistry, 2011, vol. 21, pp. 15544-15551.
Sava Gallis, D. F. et al., "NOx Adsorption and Optical Detection in Rare Earth Metal-Organic Frameworks," ACS Applied Materials & Interfaces, 2019, vol. 11, pp. 43270-43277.
Butler, K. S. et al., "Antibody Targeted Metal-Organic Frameworks for Bioimaging Applications," ACS Applied Materials & Interfaces, 2020, vol. 12, pp. 31217-31224.
Sava Gallis, D. F. et al., "Biocompatible MOFs with high absolute quantum yield for bioimaging in the second near infrared window," CrystEngComm, 2018, vol. 20, pp. 5919-5924.
Harvey, J. A. et al., "Defect and Linker Effects on the Binding of Organophosphorous Compounds in UiO-66 and Rare-Earth MOFs," The Journal of Physical Chemistry C, 2018, vol. 122, pp. 26889-26896.
Sava Gallis, D. F. et al., "Efficient MOF-based Degradation of Organophosphorus Compounds in Non-aqueous Environments," Journal of Materials Chemistry A, 2018, vol. 6, pp. 3038-3045.
Vogel, D. J. et al., "Structure and Electronic Properties of Rare Earth DOBDC Metal-Organic-Frameworks," Phys. Chem. Chem. Phys., 2019, vol. 21, pp. 23085-23093.
Wang, J. et al., "Lanthanide-Based Molecular Alloys with Hydroxyterephthalate: A Versatile System," CrystEngComm, 2021, vol. 23, pp. 100-118.
Ning, E. et al., "Interface Construction in Microporous Metal-Organic Frameworks from Luminescent Terbium-Based Building Blocks," Journal of Colloid and Interface Science, 2019, vol. 552, pp. 372-377.
Latva, M. et al., "Correlation between the Lowest Triplet State Energy Level of the Ligand and Lanthanide(III) Luminescence Quantum Yield," Journal of Luminescence, 1997, vol. 75, pp. 149-169.

* cited by examiner 4,4',4''-s-Triazine-2,4,6-triyl-tribenzoic acid (TATB)

1,3,5-Tris(4-carboxyphenyl)benzene (BTB)

1,3,5-Tris(4'-carboxy[1,1'-biphenyl]-4-yl)benzene (TCBB)

1,2,3,4,5,6-hexakis(4'-carboxylato(1,1'-biphenyl)-4-yl)benzene

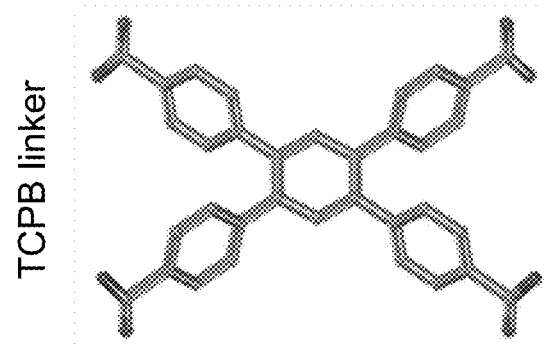
FIG. 3A
TCPB linker
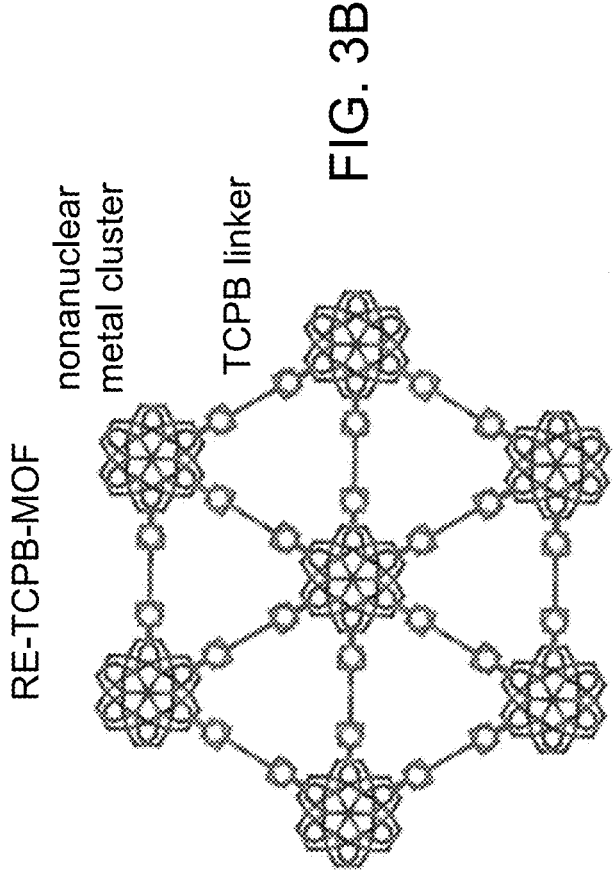
FIG. 3B
RE-TCPB-MOF
nonanuclear metal cluster
TCPB linker
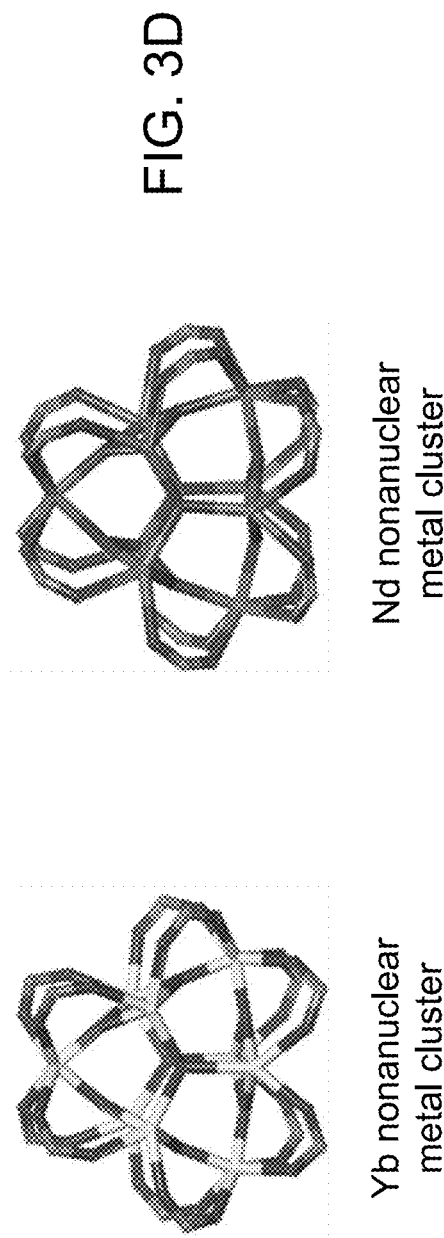
FIG. 3C
Yb nonanuclear metal cluster
FIG. 3D
Nd nonanuclear metal cluster

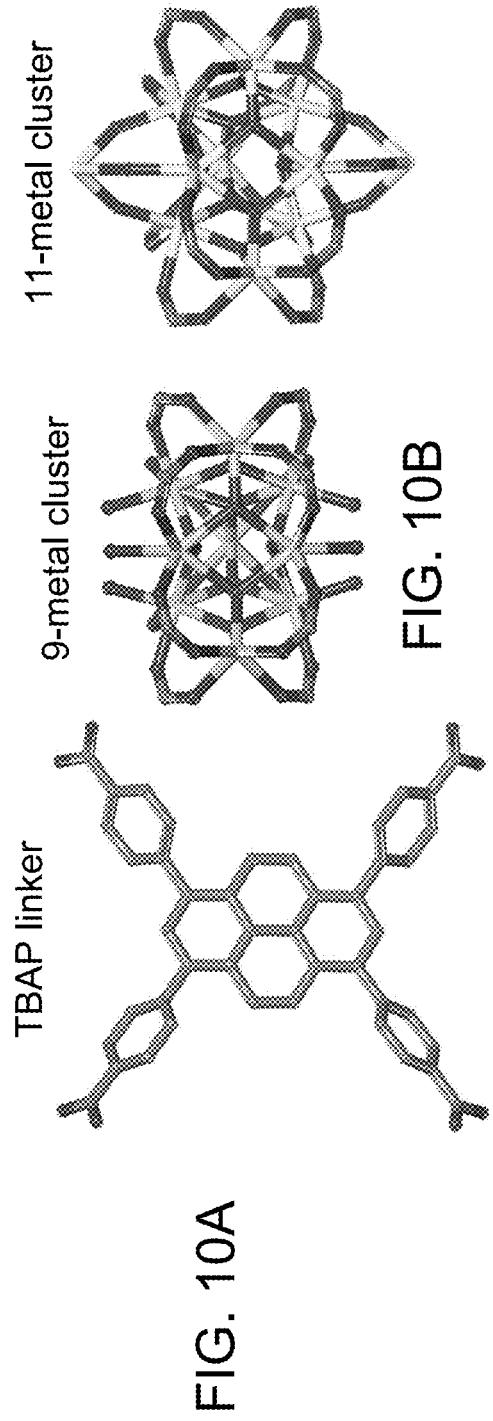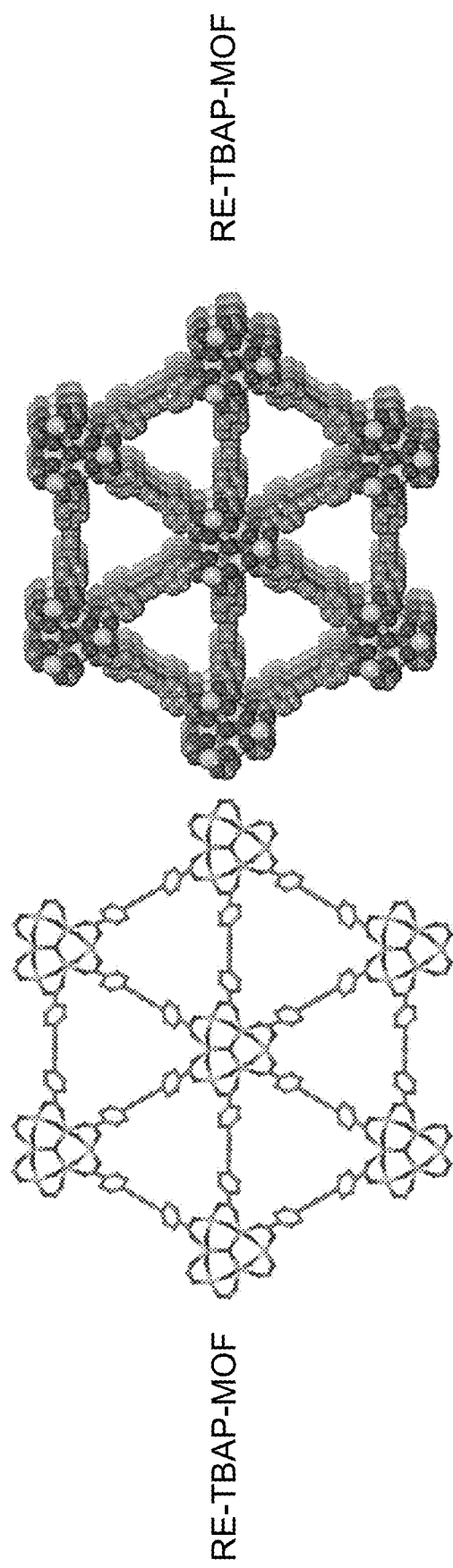
FIG. 10A  FIG. 10B  FIG. 10C  FIG. 10D  FIG. 10E

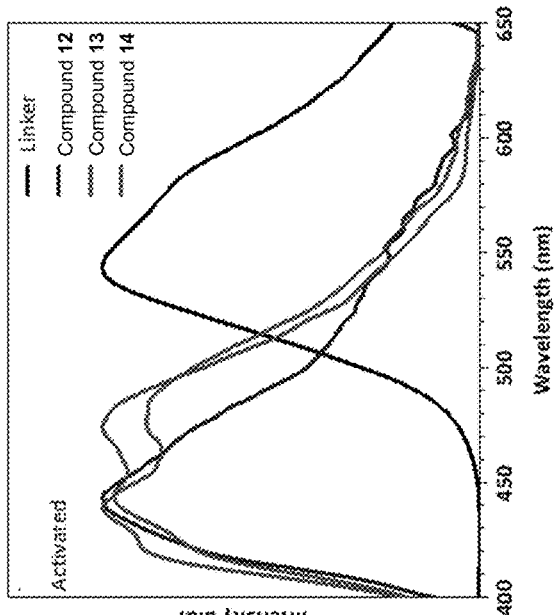
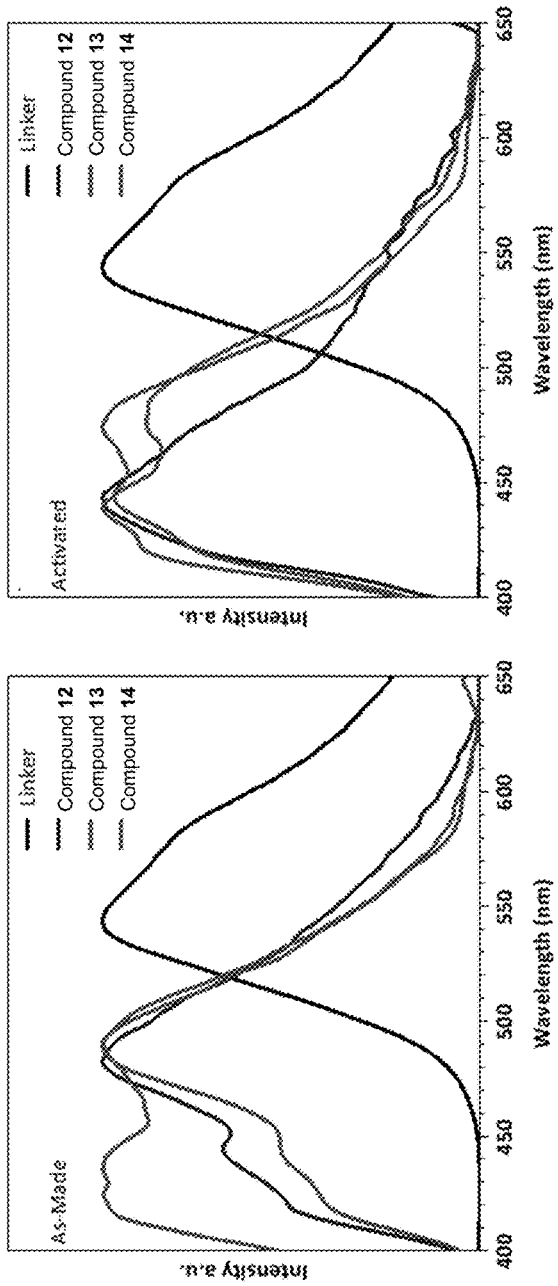
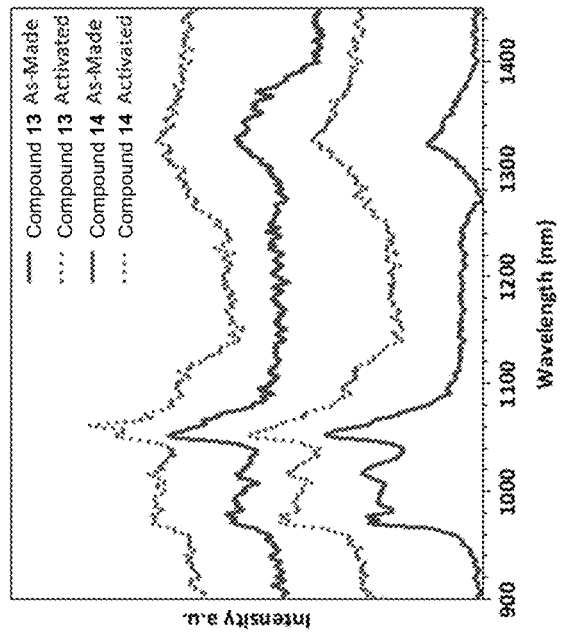
FIG. 15A
FIG. 15B
FIG. 15C

OPTICAL TAGS COMPRISING RARE EARTH METAL-ORGANIC FRAMEWORKS

CROSS-REFERENCE TO RELATED APPLICATION

This application claims the benefit of U.S. Provisional Application No. 63/086,419, filed Oct. 1, 2020, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

STATEMENT REGARDING PRIOR DISCLOSURES BY THE INVENTOR OR A JOINT INVENTOR

The following disclosure is submitted under 35 U.S.C. 102(b)(1)(A): Dr. Jacob I. Deneff, Dr. Kimberly S. Butler, Dr. Lauren E. S. Rohwer, Charles J. Pearce, Dr. Nichole R. Valdez, Dr. Mark A. Rodriguez, Dr. Ting S. Luk and Dr. Dorina F. Sava Gallis, "Encoding Mulilayer Complexity in Anti-Counterfeiting Heterometallic MOF-Based Optical Tags," *Angewandte Chemie International Edition* 60, 1203 (2021). The subject matter of this disclosure was conceived of or invented by the inventors named in this application.

FIELD OF THE INVENTION

The present invention relates to optical tags and, in particular, to optical tags comprising rare earth metal-organic frameworks.

BACKGROUND OF THE INVENTION

Tags provide a method to identify or track materials and objects ranging from currency to medicine and are particularly relevant to national security needs. Photoluminescent tags have been intensely researched for this purpose, resulting in the creation of both overt (visible) and covert (near-infrared or NIR) tags that can be quickly interrogated and unambiguously identified using simple tools or, in the case of overt tags, by sight. See W. Ren et al., *Adv. Mater.* 32(18), 1901430 (2020). Simple cost-effective optical tag materials are most common. However, tags with low complexity are undesirable, as they are easily counterfeited using the same material or a replacement with similar emission or absorption properties. See F. Miller et al., *ACS Appl. Nano Mater.* 3(1), 734 (2020); and S. Kalytchuk et al., *ACS Appl. Mater. Interfaces* 10(35), 29902 (2018). The constant threat of tag counterfeiting highlights the need to create tag materials with multilayer coding complexity.

Current options for tag fluorophores include dyes, quantum and carbon dots, and rare earth (RE) metal materials. See S. J. Park et al., *Chem. Eng. J.* 383, 123200 (2020); S. Kalytchuk et al., *ACS Appl. Mater. Interfaces* 10(35), 29902 (2018); C. Lin et al., *Nanoscale* 11(14), 6584 (2019); R. E. Gerver et al., *Lab Chip* 12(22), 4716 (2012); O. Guillou et al., *Acc. Chem. Res.* 49(5), 844 (2016); and J. Wang et al., *Inorg. Chem.* 58(4), 2659 (2019). All these systems present advantages and disadvantages. Dyes are inexpensive and readily available, but they are also easy to counterfeit, due to their broad emission peaks with simple fluorescent signatures. Dyes are also vulnerable to photobleaching, and their short fluorescence lifetimes make them less suitable for multi-layered encoding. See F. Miller et al., *ACS Appl. Nano Mater.* 3(1), 734 (2020); and D. F. Sava Gallis et al., *ACS Appl. Mater. Interfaces* 9(27), 22268 (2017).

Nanomaterials such as quantum dots or carbon dots can overcome some of these limitations. See S. Kalytchuk et al., *ACS Appl. Mater. Interfaces* 10(35), 29902 (2018); S. J. Park et al., *Chem. Eng. J.* 383, 123200 (2020); and C. Lin et al., *Nanoscale* 11(14), 6584 (2019). Their emissions are tunable by size or composition and can be significantly more complex and specific than organic fluorophores. However, these materials can be toxic and are prone to unwanted energetic interactions when closely packed. See F. Miller et al., *ACS Appl. Nano Mater.* 3(1), 734 (2020); and S. J. Park et al., *Chem. Eng. J.* 383, 123200 (2020).

RE-based nanomaterials have been thoroughly explored for use as photoluminescent tags, owing to their resistance to photobleaching, long fluorescent lifetimes, and narrow, non-overlapping emission bands over a wide range of ultraviolet, visible and near-infrared wavelengths. See L. Armelao et al., *Coord. Chem. Rev.* 254(5), 487 (2010); K. A. White et al., *J. Am. Chem. Soc.* 131, 18069 (2009); and Q. Zhang et al., *J. Mater. Chem.* 21(32), 12132 (2011). By combining multiple RE metals with different emission features in a single structure or alloy, a complex signature can be created based on the emission peaks and their ratios. See L.-y. Xin et al., *J. Inorg. Organomet. Polym. Mater.* 30(5), 1790 (2020). However, one significant drawback of RE metals is that they do not efficiently absorb light. Without a powerful excitation source, they require sensitizers in order to produce emissions bright enough to detect. In many cases, organic molecules are used to provide this sensitization through the antenna effect. See J. Wang et al., *Inorg. Chem.* 58(4), 2659 (2019); L. Armelao et al., *Coord. Chem. Rev.* 254(5), 487 (2010); and E. G. Moore et al., *Acc. Chem. Res.* 42(4), 542 (2009).

An ideal optical tag should possess complex, difficult-to-counterfeit encoding properties, including: (i) combined overt and covert signatures created using tunable optical properties capable of concomitant emission in the ultraviolet, visible, and/or near-infrared ranges; (ii) unique fluorescence lifetime features that facilitate encoded signatures as an additional layer of complexity; and (iii) distinct compositional and/or structural properties to allow orthogonal confirmation of identity. Numerous studies of tag materials often address one of these sources of complexity, but studies that combine multiple encoding methods are far more rare. See J. Wang et al., *Inorg. Chem.* 58(4), 2659 (2019); K. A. White et al., *J. Am. Chem. Soc.* 131(50), 18069 (2009); H. H. Gorris et al., *Adv. Mater.* 23(14), 1652 (2011); S. Kalytchuk et al., *ACS Appl. Mater. Interfaces* 10(35), 29902 (2018); and K. Jiang et al., *Angew. Chem.* 55(25), 7231 (2016).

In this context, metal-organic frameworks (MOFs) emerge as ideal platforms for the creation of complex optical tags with all three encoding properties, as schematically illustrated in FIG. 1. MOFs incorporate single metal ions or clusters of metal ions connected by organic linkers that can efficiently sensitize luminescent metal ions. MOFs have previously been widely investigated for a variety of non-encoding applications, including laser systems, communications, imaging, and sensing. See Furukawa et al., *Science* 341(6149), 1230444 (2013); Y. Cui et al., *Chem. Rev.* 112(2), 1126 (2012); L. Armelao et al., *Coord. Chem. Rev.* 254(5), 487 (2010); Y. Cui et al., *Chem. Rev.* 112(2), 1126 (2012); J. Rocha et al., *Chem. Soc. Rev.* 40(2), 926 (2011); Z. Hu et al., *Chem. Soc. Rev.* 43(16), 5815 (2014); D. F. Sava Gallis et al., *ACS Appl. Mater. Interfaces* 11(46), 43270 (2019); K. S. Butler et al., *ACS Appl. Mater. Interfaces* 12(28), 31217 (2020); and A. M. Rice et al., *Chem. Rev.* 120(16), 8790 (2020). The crystalline nature of MOFs enables spatial separation of the metal centers in a controllable, periodic fashion which minimizes the interaction between (and subsequent concentration quenching of) the metal centers. Through the application of rational design principles, MOF materials with advanced properties can be targeted. See Z. Chen et al., *Coord. Chem. Rev.* 386, 32 (2019); D.-X. Xue et al., *J. Am. Chem. Soc.* 135(20), 7660 (2013); and V. Guillerm et al., *Nature Chem.* 6(8), 673 (2014). The use of these design principles generally has been demonstrated using rare earth MOFs (RE-MOFs), where careful choices of ligand geometry and modulator chemistry resulted in predetermined topologies and metal cluster geometry. See D. Alezi et al., *J. Am. Chem. Soc.* 137(16) 5421 (2015); and R. G. AbdulHalim et al., *J. Am. Chem. Soc.* 139(31), 10715 (2017). Several recent studies have explored novel RE-MOF structures based on polynuclear metal clusters connected by carboxylic-based linkers, resulting in MOFs with similar topologies but varied structures and chemistries. See R. G. AbdulHalim et al., *J. Am. Chem. Soc.* 139, 10715 (2017); D.-X. Xue et al., *J. Am. Chem. Soc.* 135, 7660 (2013); R. Luebke et al., *Chem. Sci.* 6, 4095 (2015); and V. Guillerm et al., *Nat. Chem.* 6, 673 (2014).

Importantly, heterometallic MOFs can be synthesized using metals with similar oxidation states and coordination chemistry. See M. Y. Masoomi et al., *Angew. Chem.* 58(43), 15188 (2019); S. Abednatanzi et al., *Chem Soc. Rev.* 48(9), 2535 (2019); and A. M. Rice et al., *ACS Energy Lett.* 4(8), 1938 (2019). For example, RE ions can be incorporated into MOF structures at different ratios to produce crystals with unique spectral qualities. See O. Guillou et al., *Acc. Chem. Res.* 49(5), 844 (2016); D. F. Sava Gallis et al., *ACS Appl. Mater. Interfaces* 9(27), 22268 (2017); L. Armelao et al., *Coord. Chem. Rev.* 254(5), 487 (2010); K. A. White et al., *J. Am. Chem. Soc.* 131(50), 18069 (2009); Y. Cui et al., *Chem. Rev.* 112(2), 1126 (2012); J. Castells-Gil et al., *Chem. Eur. J.* 25(54), 12636 (2019); and S. Tanase et al., *J. Mater. Chem.* 21(39), 15544 (2011). Further, the photoluminescence properties of rare earth polynuclear clusters and their relevance to a variety of applications has been explored. See D. F. Sava Gallis et al., *ACS Appl. Mater. Interfaces* 9(27), 22268 (2017); D. F. Sava Gallis et al., *ACS Appl. Mater. Interfaces* 11(46), 43270 (2019); K. S. Butler et al., *ACS Appl. Mater. Interfaces* 12(28), 31217 (2020); D. F. Sava Gallis et al., *CrystEngComm* 20(39), 5919 (2018); J. A. Harvey et al., *J. Phys. Chem. C* 122(47), 26889 (2018); D. F. Sava Gallis et al., *J. Mater. Chem. A* 6(7), 3038 (2018); and D. J. Vogel et al., *Phys. Chem. Chem. Phys.* 21(41), 23085 (2019).

The optical characteristics of antenna-RE metal complexes are strongly affected by the excited states of both components. The excited triplet state of the antenna molecule serves as an energy donor to the metal, causing excitation and resulting in luminescence. Molecules with triplet state energies close to those of their metals transfer energy to those metals inefficiently, impeded by back-transfer or by competition for excitation. See E. Ning et al., *J. Colloid Interface Sci.* 552, 372 (2019); and M. Latva et al., *J. Lumin.* 75, 149 (1997). While this concept is known, it has rarely been exploited deliberately. See T. Xia et al., *Chin. Chem. Lett.* 29, 861 (2018); and L. Li et al., *Adv. Funct. Mater.* 26, 8677 (2016). The present invention addresses this shortcoming by the rational design and synthesis of heterometallic RE-MOFs with targeted PL properties through deliberate manipulation of energy transfer within the framework. The excited state energies of ligands can be estimated by measuring their excitation and emission spectra, allowing for assessment of each ligand's potential for excitation or efficient energy transfer to a specific metal. See J. Wang et al., *CrystEngComm* 23, 100 (2021). Choosing a ligand with a low energy triplet state or a particular excitation wavelength can allow metal emissions to be hidden, even under direct excitation of the metal. See E. Ning et al., *J. Colloid Interface Sci.* 552, 372 (2019); and M. Latva et al., *J. Lumin.* 75, 149 (1997). This enables the creation of RE-MOFs with emission spectra independent of their metallic composition.

To date, RE-MOFs have rarely been explored as anti-counterfeiting tags. Studies that do examine RE-MOF tags focus on enriching the emission spectra through the incorporation of multiple metals. See J. Wang et al., *Inorg. Chem.* 58(4), 2659 (2019); and K. A. White et al., *J. Am. Chem. Soc.* 131(50), 18069 (2009). Additionally, the inherent porosity in MOFs has been utilized via inclusion of photoswitchable quenching molecules, allowing the tags to be selectively revealed. See Z. Li et al., *Angew. Chem.* 131(50), 18193 (2019). In this context, no studies have focused on the design of multilayered encoding of MOFs. Additionally, fundamental understanding of the specific structural-function relationships underlying the photoluminescent properties used for encoding are lacking.

SUMMARY OF THE INVENTION

The present invention is directed to an optical tag comprising a rare earth metal-organic framework, wherein the rare earth metal-organic framework comprises two or more rare earth metals arranged in polynuclear metal clusters connected by carboxylic acid-based linkers. The optical tag can have both unique overt (visible) and covert (near infrared) optical emission signatures and unique fluorescence lifetime signatures.

The invention is further directed to a method to identify or track an object, comprising associating an optical tag comprising a rare earth metal-organic framework with the object and interrogating at least one encoding property of the optical tag to authenticate the object. The at least one encoding property can comprise a unique optical emission signature, a unique fluorescence lifetime decay signature, or a compositional or structural property. The unique optical emission signature can comprise an overt optical emission in the visible range and/or a covert optical emission signature in the near-infrared range and the interrogating can comprise exciting the overt and/or covert optical emissions with one or more optical excitation sources. The step of interrogating can comprise interrogating at least two encoding properties of the optical tag. For example, the step of associating can comprise printing an ink containing the optical tag on the object.

RE-MOF optical tags with combined overt and covert signatures and unique fluorescence lifetime features can facilitate the use of orthogonal identification methods to increase complexity and security by combining multiple methods of encoding in a single material. This can be accomplished through spectral patterns and lifetimes in both visible and non-visible ranges, wherein variations in these properties are based on subtle compositional changes in the material. For example, the incorporation of multiple metals into unique RE-MOF tags has a direct effect on their photoluminescence properties beyond emission spectra signature peaks. That is, inter-metal charge transfer increases the complexity of the tags' resulting photophysical properties. In addition, linker selection can be used to control the resulting photoluminescent properties in Re-MOFs. For example, by choosing a linker with a low energy excited state, the deliberate concealment of metal-related emissions in the visible range (e.g., Eu), while retaining NIR emissions (e.g., Nd, Yb) can be accomplished. Finally, an additional layer of complexity is shown by guest-dependent PL responses, resulting in significant changes to their emission properties, independent of framework composition. The relationships between structure, composition, and photoluminescence of the RE-MOF materials enables a large library of rationally designed, highly complex optical tags to be created. The incorporation of other metal centers and post-synthetic modifications can also create additional functionality.

BRIEF DESCRIPTION OF THE DRAWINGS

The detailed description will refer to the following drawings, wherein like elements are referred to by like numbers.

FIG. 3A is a ball-and-stick representation of a TCPB linker. FIG. 3B is a ball-and-stick representation of an RE-TCPB-MOF framework structure highlighting porous channels. FIG. 3C is a ball-and-stick representation of an Yb nonanuclear metal cluster in compound 1. FIG. 3D is a ball-and-stick representation of a Nd nonanuclear metal cluster in compound 1. Atom color scheme: C=grey; O=red; Yb=light green; Nd=dark green. H atoms were omitted for clarity.

FIG. 10A is a ball-and-stick representation of the TBAP linker. FIG. 10B is a ball-and-stick representation of a Eu-based 9-metal cluster. FIG. 10C is a ball-and-stick representation of a Yb-based 11-metal cluster. FIG. 10D is a ball-and-stick representation of the framework structure. FIG. 10E is a space filling representation, highlighting porous channels. Atoms color scheme: C=gray, O=red, Eu=green, Yb=light green. H atoms and coordinating solvent molecules were omitted for clarity.

FIGS. 15A and 15B show photoluminescence emission spectra of as-made (FIG. 15A) and activated (FIG. 15B) compounds 12, 13, and 14 in the visible range, with the emission of the TBAP linker included for comparison. FIG. 15C is a graph of NIR emitting properties in as-made and activated compounds 13 and 14.

DETAILED DESCRIPTION OF THE INVENTION

The present invention is directed to heterometallic RE-MOFs based on highly connected, polynuclear metal clusters. Distinct structural and compositional features have direct implications for photophysical properties, specifically, properties based on charge transfer interactions. As examples of the invention, controllable multi-metal compositions (based on varying ratios of rare earth metal ions) have been used to produce complex tags with multiple layers of encoding via: (i) associated emission properties in both visible and NIR, (ii) unique fluorescence lifetime decay signatures, and (iii) variation of metal composition across isostructural MOFs.

Figure 1:
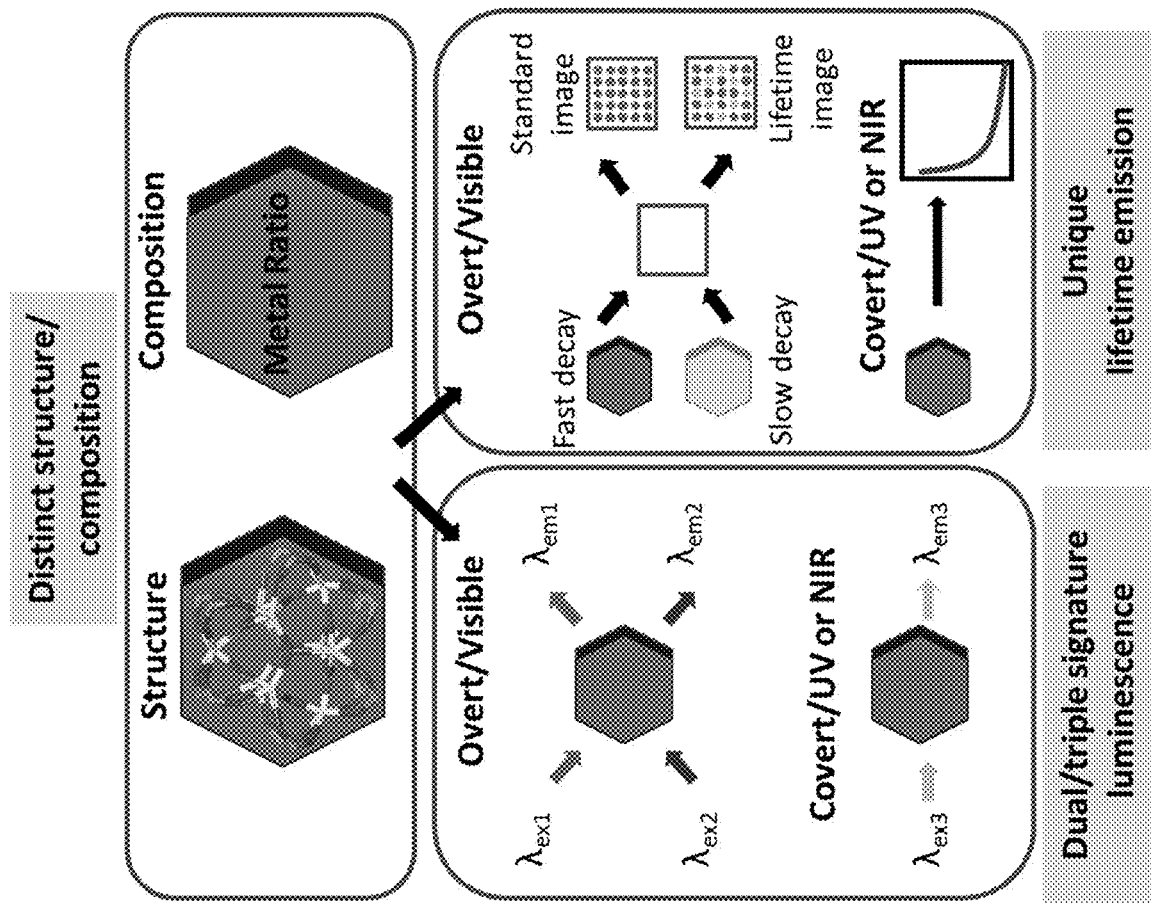
FIG. 1 is a schematic representation of heterometallic MOF-based optical tags with several layers of encoded complexity.
Figure 2A:
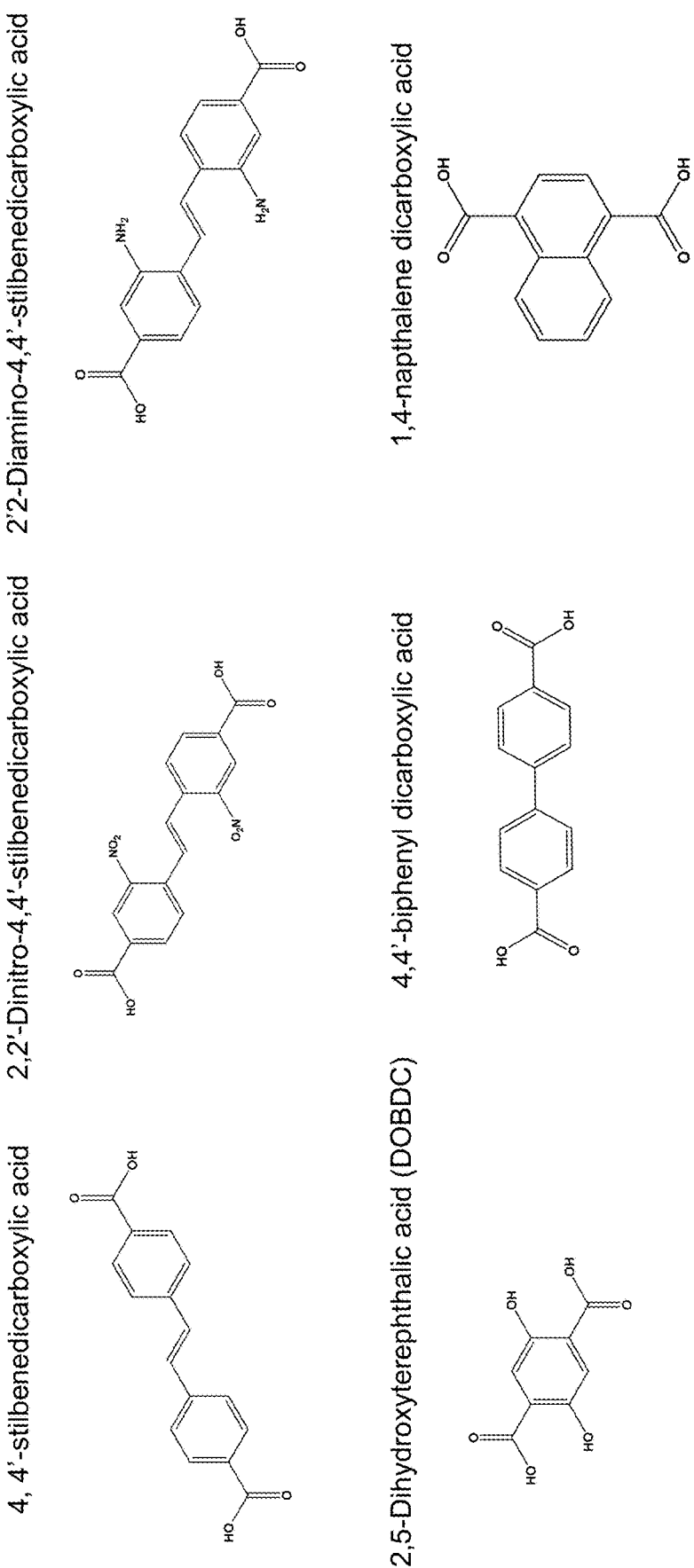
FIG. 2A shows examples of dicarboxylic acid linkers.
Figure 2B:
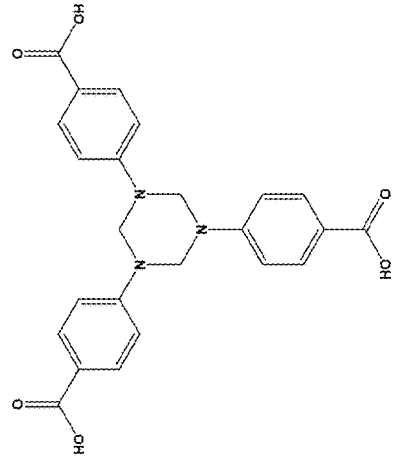
FIG. 2B shows examples of tricarboxylic acid linkers.
Figure 2B:
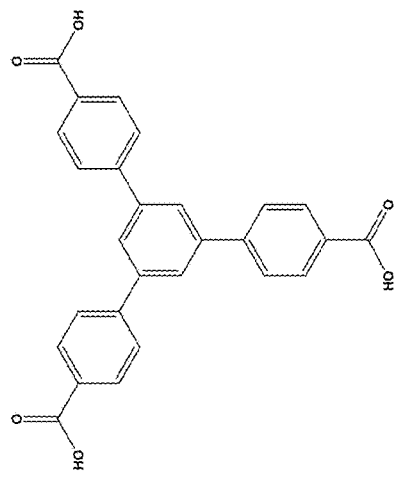
Figure 2B:
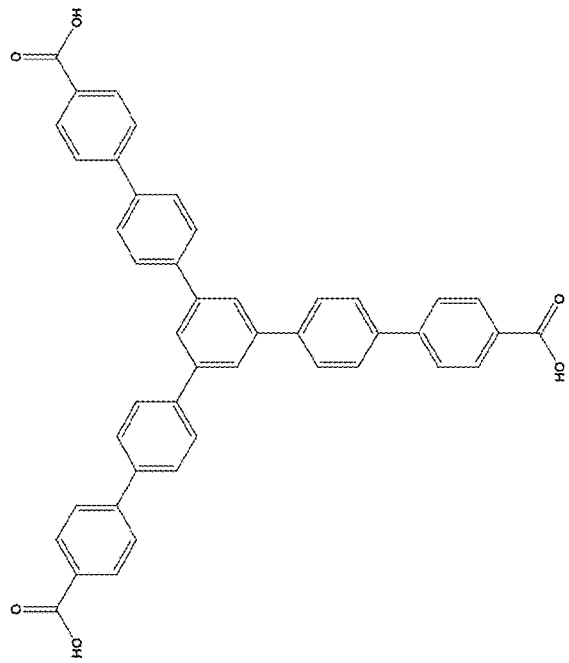
Figure 2C:
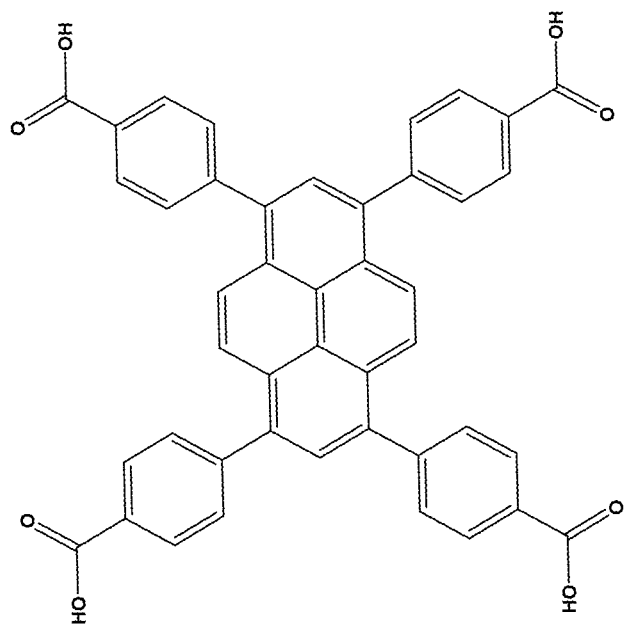
FIG. 2C shows examples of tetracarboxylic acid linkers.
Figure 2C:
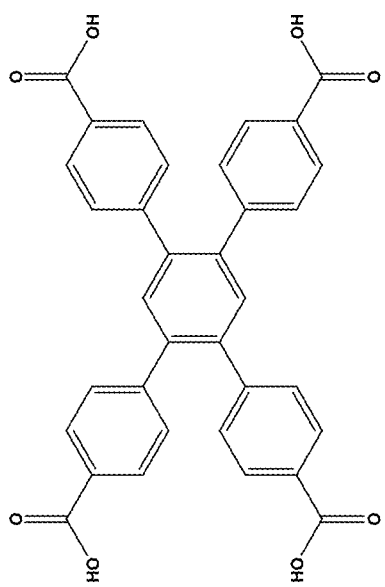
Figure 2D:
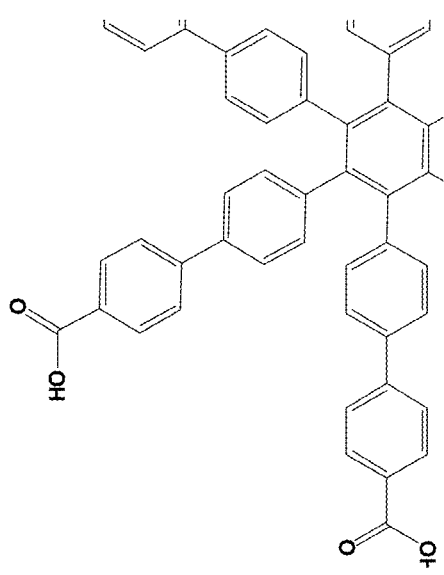
FIG. 2D shows an example of a hexacarboxylic acid linker.

A variety of rare earth metals form polynuclear metal clusters that can be connected with carboxylic acid-based linkers. Examples of rare earth metals that can be used with the invention include Nd, Yb, Eu, Y, Ce, Pr, Sm, Gd, Tb, Dy, Ho, Er, and Tm. These rare earth metals will result in distinct emission properties. A variety of carboxylic acid-based linkers can be used, including di-, tri-, tetra-, and hexacarboxylic acids. As shown in FIG. 2A, exemplary linear dicarboxylic acid linkers include 4, 4'-stilbenedicarboxylic acid, 2,2'-Dinitro-4,4'-stilbenedicarboxylic acid, 2'2-Di-amino-4,4'-stilbenedicarboxylic acid, 2,5-Dihydroxyterephthalic acid (DOBDC), 4,4'-biphenyl dicarboxylic acid, and 1,4-napthalene dicarboxylic acid. As shown in FIG. 2B, exemplary tricarboxylic acid linkers include 1,3,5-Tris(4- carboxyphenyl)benzene (BTB), 4,4',4''-5-Triazine-2,4,6-triyl-tribenzoic acid (TATB), and 1,3,5-Tris(4'-carboxy[1,1'-biphenyl]-4-yl)benzene (TCBB). As shown in FIG. 2C, exemplary tetracarboxylic acid linkers include 1,2,4,5-Tetrakis(4-carboxyphenyl)benzene (TCPB) and 1,3,6,8-Tetra(4/carboxyphenyl)pyrene (TBAP). As shown in FIG. 2D, an exemplary hexacarboxylic acid linker includes 1,2,3,4,5,6-hexakis(4'-carboxylato(1,1'-biphenyl)-4-yl)benzene. A linear linker, such as DOBDC, will likely form hexanuclear metal clusters. Tetratopic linkers, such as TCPB, will likely form nonanuclear metal clusters. However, other tetratopic linkers, such as TBAP, can form 11-metal clusters.

Example: RE-MOFs with TCPB Linkers (RE-TCPB-MOFs)

As examples of the invention, the rare earth metals Nd, Yb, and Eu were synthesized to form metal clusters with TCPB linkers. A variety of structural probes were used to characterize the exemplary materials, including X-ray single crystal and powder X-ray diffraction (PXRD), Scanning Electron Microscopy (SEM)—Energy Dispersive Spectroscopy (EDS), along with a comprehensive evaluation of photophysical properties via emission properties and time domain photoluminescence lifetime.

The exemplary RE-TCPB-MOFs were successfully synthesized with a variety of metal compositions and ratios, as facilitated by the control over the geometry of the molecular building blocks, namely the nonanuclear metal clusters, at the molecular level. This control was enabled by predetermined synthetic conditions via linker geometry, modulator and similar coordination chemistry of the RE metals, resulting in a highly tunable isostructural series. The compositions of the final materials were determined by the relative amounts of precursors, allowing a significant number of unique metal combinations to be created in a controlled and predictable manner.

To synthesize the RE-TCPB-MOFs, a reaction mixture was prepared containing the rare earth precursors, $Nd(NO_3)_3 \cdot 6H_2O$, $Yb(NO_3)_3 \cdot 5H_2O$, and/or $EuCl_3 \cdot 6H_2O$, combined with 1,2,4,5-Tetrakis(4-carboxyphenyl)benzene (TCPB), and 4-fluorobenzoic acid (FBA), in solution with N,N'-dimethylformamide (DMF) and $HNO_3$. The reaction mixture was placed in a 20 mL scintillation vial and heated to 115° C. at 1.5° C./min, held at 115° C. for 48 hours, then cooled to room temperature at 1.5° C./min. The resulting crystals were washed three times with an excess of DMF, and three times with an excess of methanol before being suspended in methanol. The compositions of the various compounds synthesized are shown in Table 1.

TABLE 1

RE-TCPB-MOF compound designations and compositions.

| Compound | Composition |
|---|---|
| 1 | $Nd_{0.5}Yb_{0.5}TCPB$ |
| 2 | $Nd_{0.33}Yb_{0.33}Eu_{0.33}TCPB$ |
| 3 | $Nd_{0.71}Yb_{0.29}TCPB$ |
| 4 | $Nd_{0.27}Yb_{0.73}TCPB$ |
| 5 | $Nd_{0.18}Yb_{0.82}TCPB$ |
| 6 | $Nd_{0.45}Yb_{0.45}Eu_{0.10}TCPB$ |
| 7 | $Nd_{0.42}Yb_{0.42}Eu_{0.16}TCPB$ |
| 8 | $Nd_{0.17}Yb_{0.17}Eu_{0.66}TCPB$ |
| 9 | NdTCPB |
| 10 | YbTCPB |
| 11 | EuTCPB |

Structural Characterization of RE-TCPB-MOFs

Structural Data for the Series of RE-TCPB-MOFs was Derived Using Single crystal X-ray crystallography to probe the structure of the compounds in order to provide additional structural information regarding metal arrangement and speciation. The structure of compound 1, $Nd_{0.50}Yb_{0.50}TCPB$, was characterized and formulated by single crystal X-ray crystallography studies as $[(Nd_xYb_{9-x})(\mu_3\text{-OH})_6(\mu_3\text{-OH})_6(\mu_3\text{-O})_2(H_2O)_6(H_2O)_3(TCPB)_3]^- [NH_2(CH_3)_2]^+ \cdot 12(DMF)$. The linker, framework, and individual Nd and Yb metal cluster structures are shown in FIGS. 3A-D. As with a previously reported Y-based analogue, the framework is constructed from nonanuclear metal clusters. See R. G. AbdulHalim et al., *J. Am. Chem. Soc.* 139(31), 10715 (2017). In a representative cluster, three independent metal ions (either Nd or Yb) are seven-coordinate, connecting to carboxylate groups of four distinct TCPB linkers, two $\mu_3$-OH, and one water molecule coordinating in the apical position. The coordination sphere of the six eight-coordinate remaining (Nd or Yb) metal ions is completed by two carboxylate oxygen atoms from two independent TCPB linkers, four $\mu_3$-OH, one $\mu_3$-O and one water molecule. The resulting structure is negatively charged, and one dimethyl ammonium cation provides charge neutrality.

The structure is disordered, with the nine metal clusters occupying two different orientations, with a 60° rotation about the c-axis. The carboxylate groups from TCPB rotate to accommodate the disorder. Although it is difficult to unequivocally distinguish between the two metals due to the disorder, the relative size difference and different orientation between distinct clusters indicates that the material crystallizes with predominately single-metal ion-based nonanuclear clusters rather than heterometallic clusters containing both Nd and Yb. This has direct implications for the resulting photoluminescent properties as directed by metal-to-metal charge transfer.

Figure 4:
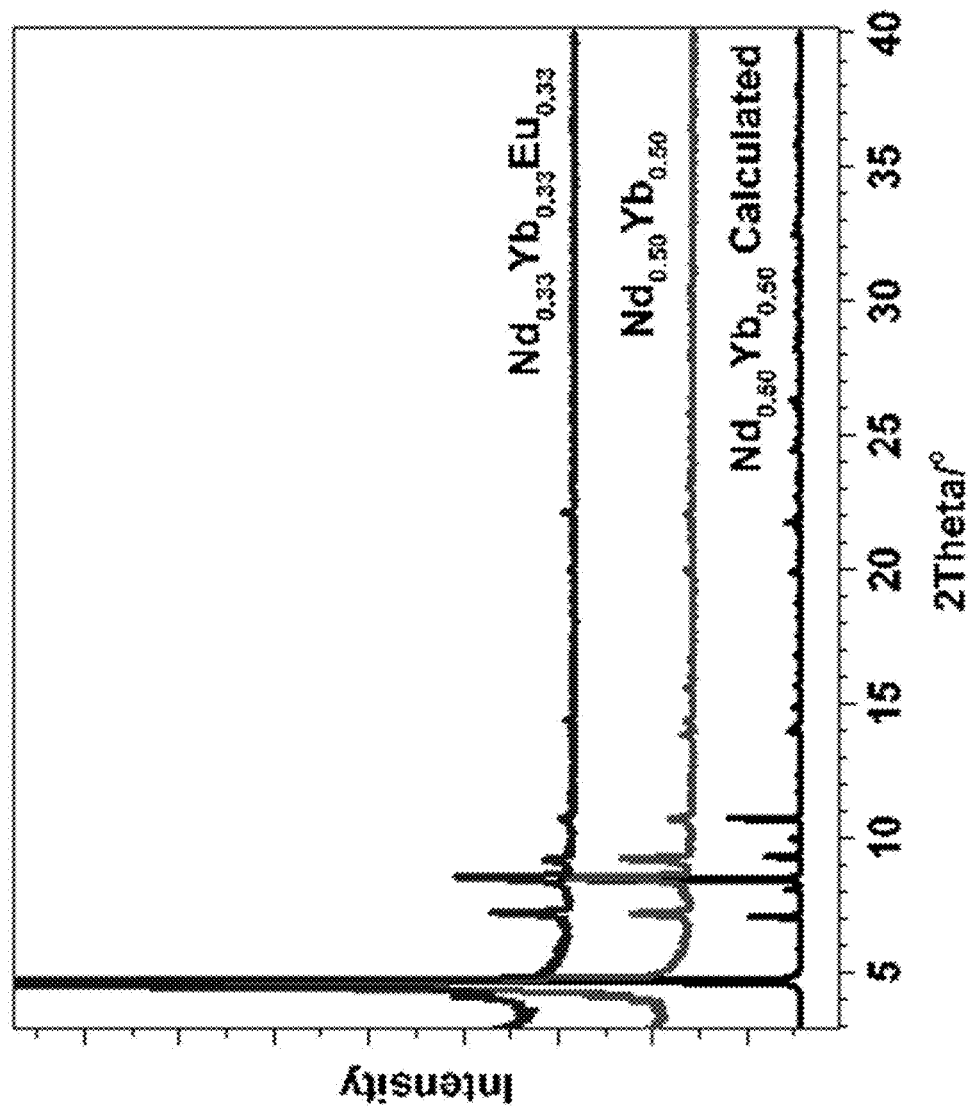
FIG. 4 shows PXRD patterns of representative di- and trimetal compositions in compounds 1 and 2.

Following detailed characterization via single crystal X-ray diffraction of a representative structure in compound 1, the phase identity and purity of various compositions in compounds 2-11 were probed by powder X-ray diffraction. For clarity purposes, the analyses described herein are focused on representative dimetal (compound 1) and trimetal (compound 2) compositions. The PXRD patterns for these representative samples are shown in FIG. 4. The PXRD patterns indicate that all the compounds are isostructural and phase-pure.

Figure 5A:
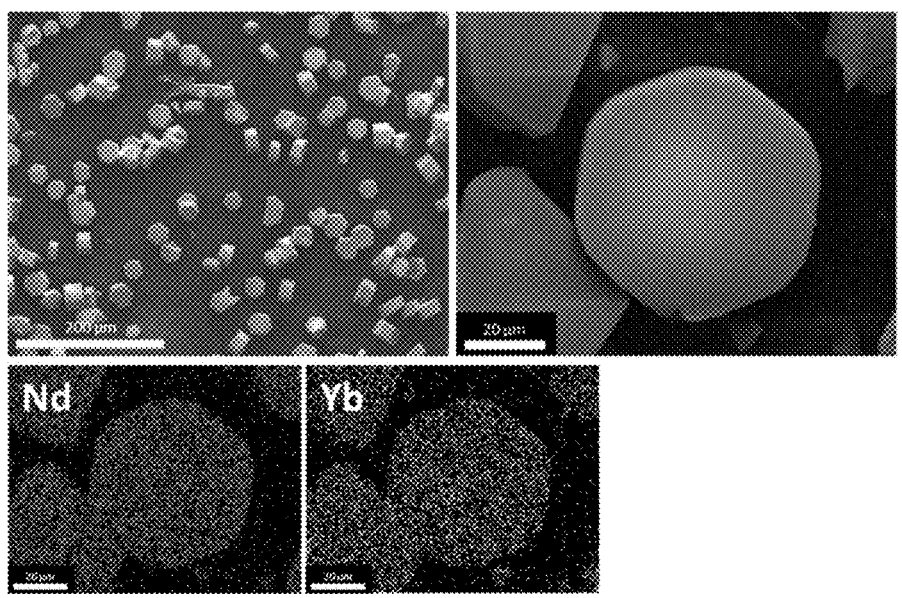
FIG. 5A shows an SEM image and EDS maps for compound 1.
Figure 5B:
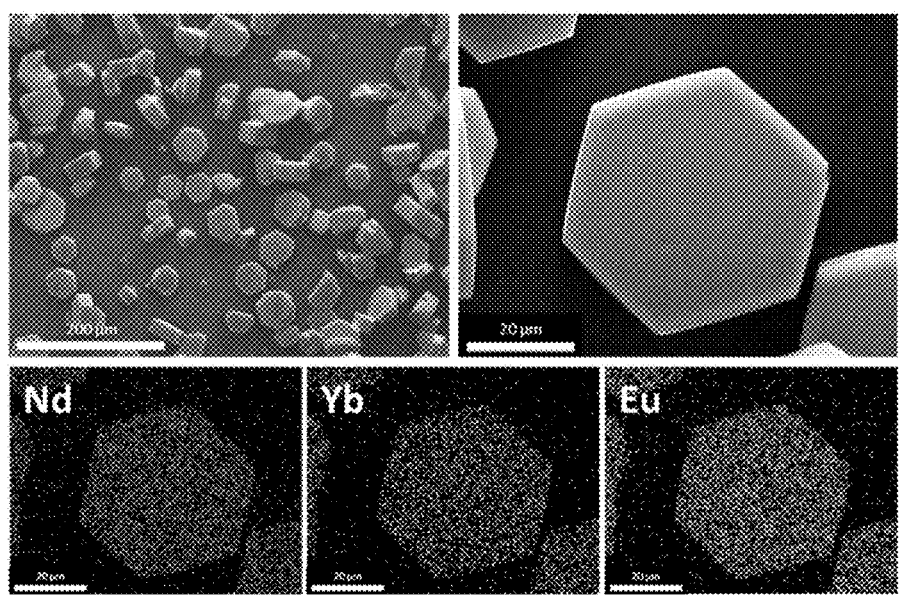
FIG. 5B shows an SEM image and EDS maps for compound 2.

Crystal morphology, relative metal content, and metal distribution for each synthesized compound were examined via complimentary SEM-EDS studies. All synthesized crystals present hexagonal plate-like morphology, as shown in the SEMs in FIGS. 5A and 5B. Elemental mappings for compounds 1 and 2 in FIGS. 5A and 5B show that the metals are homogeneously distributed at individual single crystal level. Examination of multiple crystals in each sample showed consistent metal composition within each sample as a whole.

Through EDS, the metal ratio in the dimetal compounds was found to be proportional to the molar ratio of the precursors, with the proportion in the final MOF material weighted more heavily toward Yb than the precursor solution. In the trimetal TCPB compounds, the proportions of each metal in the final MOF were equivalent to the molar ratio of precursors used in the synthesis, allowing the Eu content to be fine-tuned while the Nd/Yb ratio remained constant.

$N_2$ Sorption Measurements of RE-TCPB-MOFs

Figure 6:
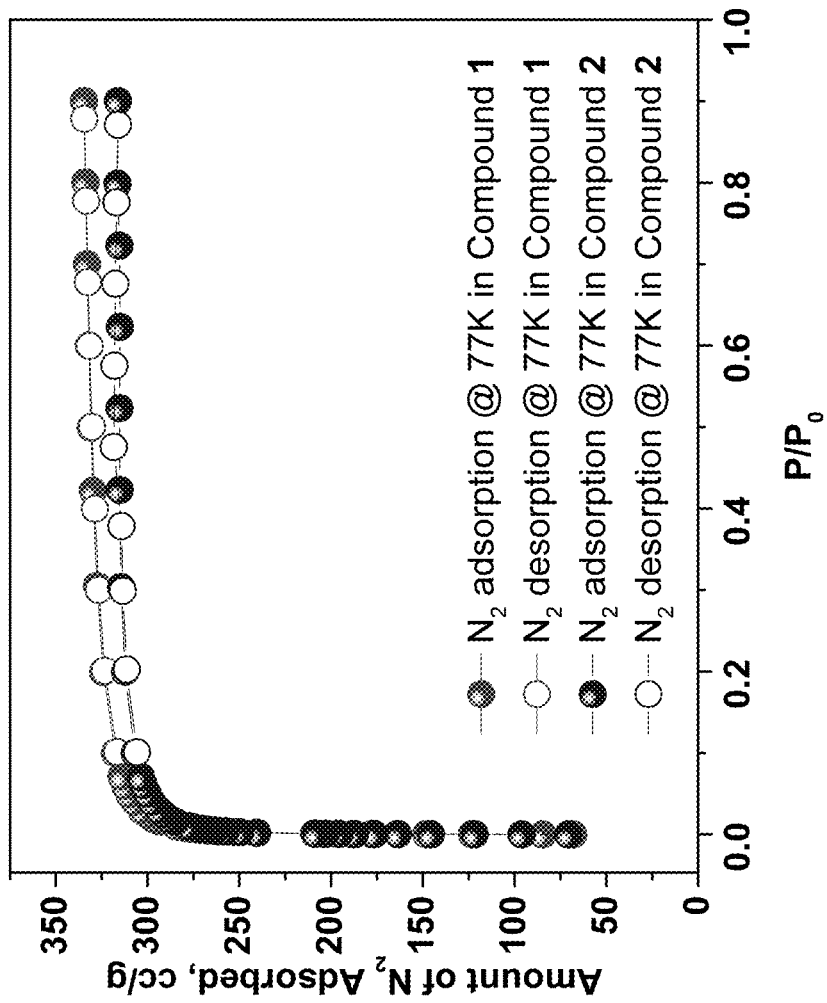
FIG. 6 is a graph of $N_2$ sorption isotherms measured at 77K for compounds 1 and 2.

The porous qualities of the samples were probed using $N_2$ sorption measured at 77 K. The type I isotherms for compounds 1 and 2 are shown in FIG. 6, indicating the fully reversible gas sorption process characteristic of microporous materials. The BET analyses demonstrated microporosity in the materials, with high specific surface areas. The BET surface area was calculated to be 1302 m$^2$/g for compound 1 and 1264 m$^2$/g for compound 2. The porosity of these compounds can provide an additional avenue for tag customization or further exploitation of tailored properties using guest molecules. Porosity and framework topology also effect the distance between metal centers and their ability to exchange energy with each other directly.

Photophysical Properties Evaluation of RE-TCPB-MOFs

Several photoluminescent properties of the MOF materials can be leveraged to produce complex tags, including rich emission spectra, and the photoluminescent lifetimes, which can be used to create distinguishable patterns. See J. Wang et al., *Inorg. Chem.* 58(4), 2659 (2019); K. A. White et al., *J. Am. Chem. Soc.* 131(50), 18069 (2009); J. Samuel et al., *Chem. Commun.* 46(15), 2647 (2010); Y. Liu et al., *Nanoscale* 3(11), 4804 (2011); S. Kalytchuk et al., *ACS Appl. Mater. Interfaces* 10(35), 29902 (2018); and K. Jiang et al., *Angew. Chem.* 55(25), 7231 (2016). Therefore, the photophysical properties of the RE-TCPB-MOFs were examined as a function of metal composition.

Figure 7A:
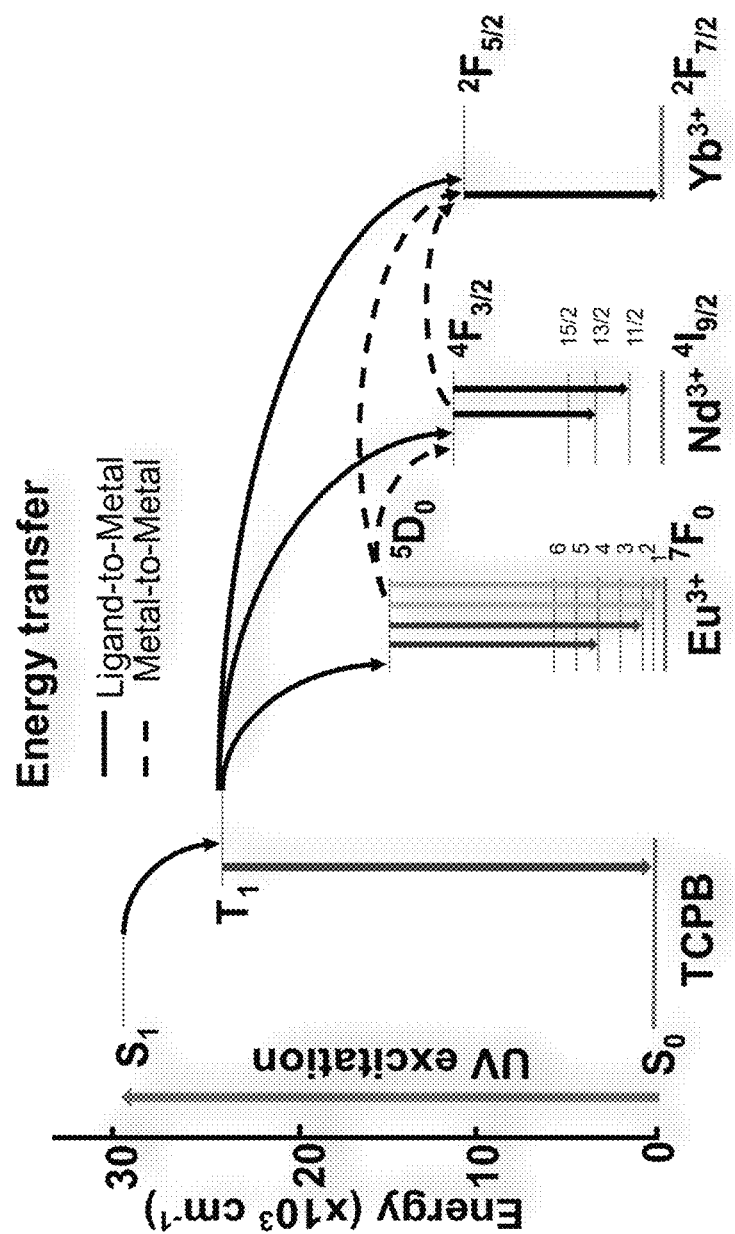
FIG. 7A is a schematic depiction of complex energy transfer in the RE-MOF systems, including ligand-to-metal and metal-to-metal energy transfer.
Figure 7C:
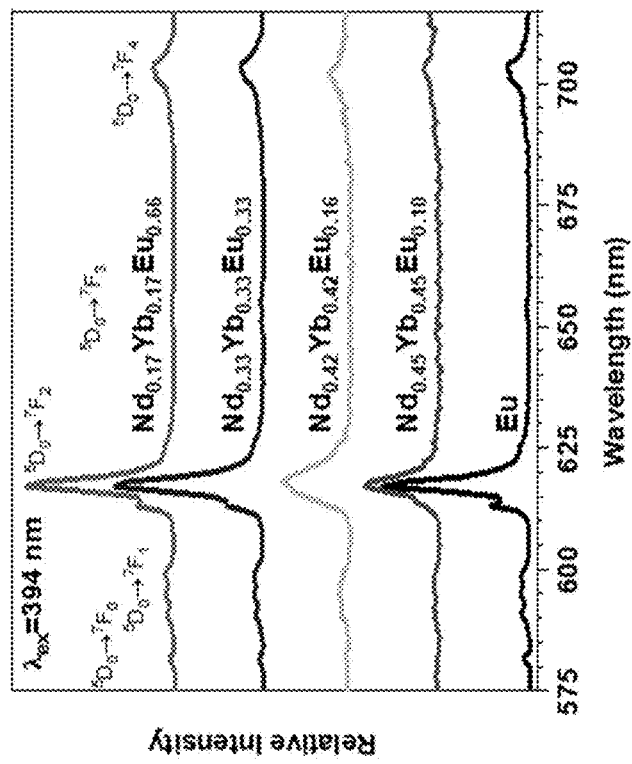
FIGS. 7B-7E show photoluminescence spectra for single metal compounds 9 and 11 (Nd and Eu), the dimetal compounds 1 ($Nd_{0.5}Yb_{0.5}$), 3 ($Nd_{0.71}Yb_{0.29}$), 4 ($Nd_{0.27}Yb_{0.73}$), and 5 ($Nd_{0.18}Yb_{0.82}$), and the trimetal compounds 2 ($Nd_{0.33}Yb_{0.33}Eu_{0.33}$), 6 ($Nd_{0.45}Yb_{0.45}Eu_{0.10}$), 7 ($Nd_{0.42}Yb_{0.42}Eu_{0.16}$), and 8 ($Nd_{0.17}Yb_{0.17}Eu_{0.66}$).
Figure 7B:
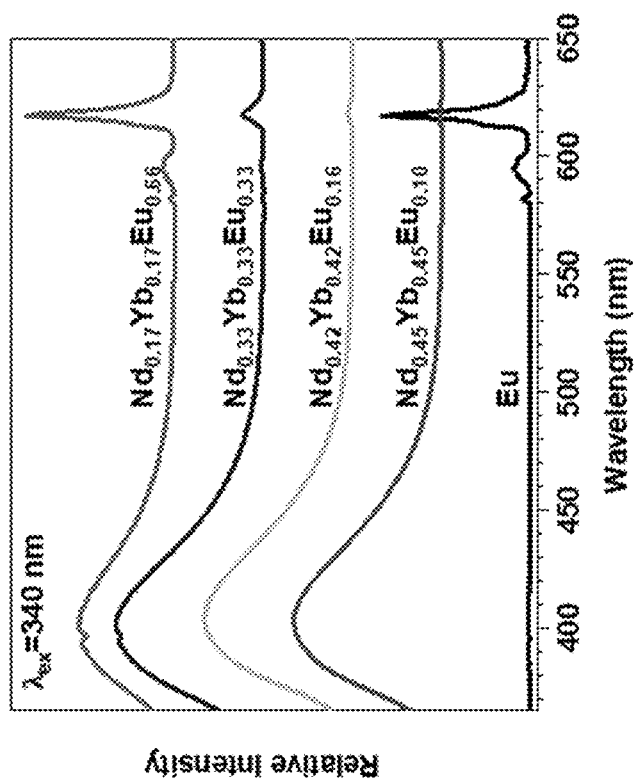
Figure 7E:
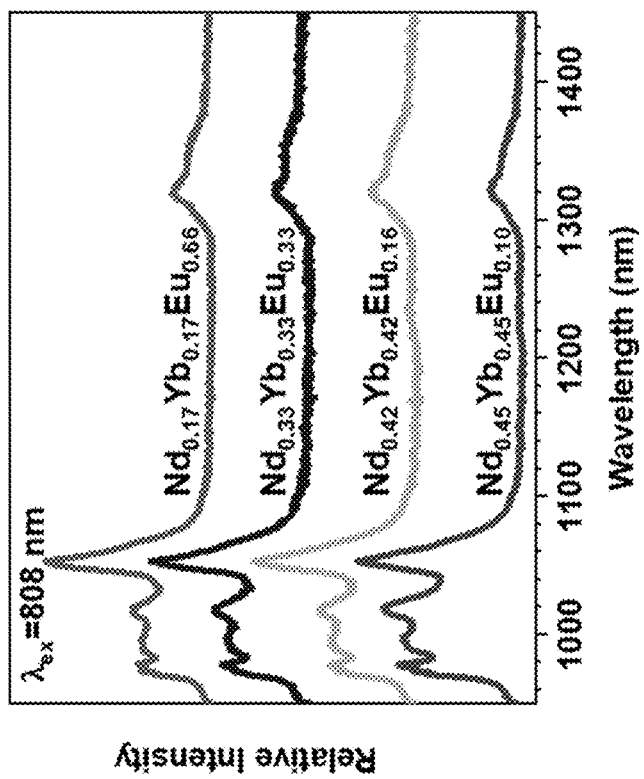
Figure 7D:
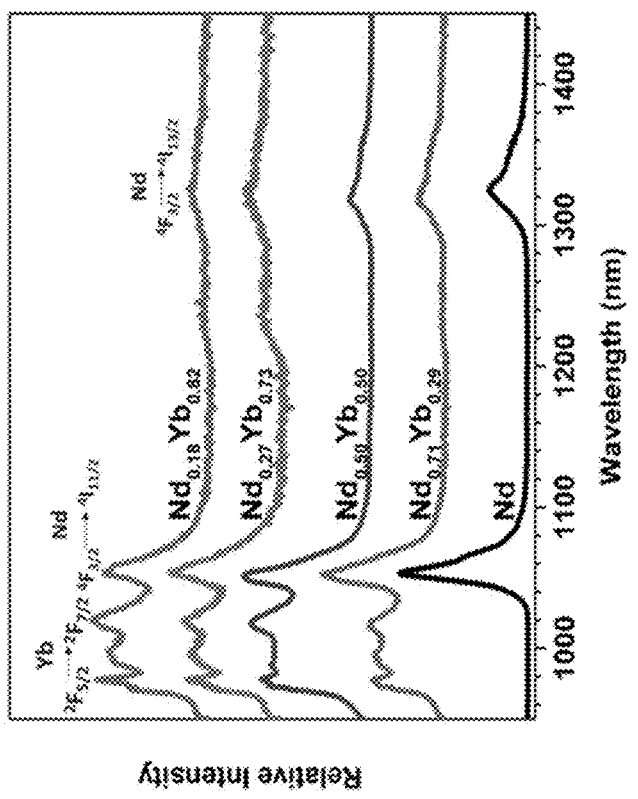

First, a 808 nm laser was used to directly excite the Nd-metal centers present in the Nd and Yb compounds, as shown in FIGS. 7D and 7E. This resulted in a sharp emission band at 1060 nm attributed to the $^4F_{3/2} \rightarrow ^4I_{11/2}$ transition and a split band centered at 1325 nm attributed to $^4F_{3/2} \rightarrow ^4I_{13/2}$ transition, both characteristic of Nd and easily visible in the single-metal Nd composition, compound 9, (black trace of FIG. 7D). See Y.-B Lu et al., *Inorg. Chem. Commun.* 111, 107667 (2020). A broad, split band ranging from ~980-1040 nm is further attributed to the $^5F_{5/2} \rightarrow ^2F_{7/2}$ transition in Yb, as shown in the dimetal compositions, compounds 1, 3, 4, and 5 in FIG. 7D. See J.-C. Bünzli and C. Piguet, *Chem. Soc. Rev.* 34(12), 1048 (2005); and N. Wu et al., *Anal. Chem.* 92(2), 2027 (2020). The presence of emissions associated with Yb after direct excitation of Nd is indicative of an energy transfer between Nd and Yb metal ions.

It is important to note the ratios of Nd-to-Yb peak intensity are directly correlated to the molar ratios of Nd-to-Yb in the dimetal compounds. That is, a gradual decrease in the Nd peak intensity and an increase of those associated with Yb, as function of decreased Nd content are clearly noted in these varied compositions. As a result, the dimetal systems demonstrate complex covert tag potential, with unique signatures from both the Nd and Yb components creating a clearly identifiable pattern.

Trimetal systems were created with the addition of Eu to increase the complexity of these optical tags and to determine whether the addition of a visible signature could create a tag having both overt and covert properties, without significant alteration of the NIR properties. Eu has characteristic narrowband orange-red emission peaks that are not strongly influenced by the surrounding crystal field and a slow, single-exponential decay with characteristic lifetimes of ~1 ms or longer.

The NIR emission properties of trimetal compositions (compounds 2, 6, 7, and 8) were interrogated via direct excitation of Nd ions at 808 nm, as shown in FIG. 7E. Interestingly, Eu incorporation did not alter the NIR emission bands from those observed in the dimetal compounds (FIG. 7D), indicating that Eu does not distort the Nd and Yb site-symmetry or lead to disorder in the local surroundings. The introduction of Eu into trimetal RE-TCPB-MOFs resulted in modulation in the relative intensity of the peaks associated with Nd and Yb in the NIR, specifically a relative decrease in the intensity of the Yb peak, despite the ratio of those two metals in the structure remaining constant. The emergent property, based on metal-to-metal charge transfer in the MOF, suggests the use of composition as an additional orthogonal identifier for the tags, the non-emitting metal modulating the emissions of those that do emit.

After the trimetal compounds' NIR properties were confirmed, the optical properties in the visible range were examined through both direct excitation of Eu and excitation of the TCPB linker, as shown in FIGS. 7C and 7B, respectively. Under linker excitation at 340 nm, a broad peak is visible spanning from 375 nm to 457 nm for all compounds, attributed to the linker emission. Peaks attributed to Eu are visible at this excitation wavelength as well but are more pronounced when Eu is excited directly. When directly excited at 394 nm, the characteristic Eu$^{3+}$ emission peaks are observed at 580 nm ($^5D_0 \rightarrow ^7F_0$), 590 nm ($^5D_0 \rightarrow ^7F_1$), a large peak at 617 nm ($^5D_0 \rightarrow ^7F_2$) and a small peak at 703 nm ($^5D_0 \rightarrow ^7F_4$). See J. Wang et al., *Inorg. Chem.* 58(4), 2659 (2019); Y. Cui et al., *Chem. Rev.* 112(2), 1126 (2012); P. A. Tanner, "Lanthanide Luminescence in Solids," In *Lanthanide Luminescence: Photophysical, Analytical and Biological Aspects*, Hänninen, P.; Härma, H., Eds. Springer Berlin Heidelberg: Berlin, Heidelberg, 2011; pp 183-233; and D. F. Sava Gallis et al., *Chem. Mater.* 26(9), 2943 (2014).

For both excitation wavelengths the intensities of the emission peaks associated with Eu are directly correlated with the Eu content of the MOF examined, demonstrating the potential to tune the intensity of the emission signature through control of the Eu addition. Adding Eu to the RE-TCPB-MOFs both modulated the NIR emissions and encoded an additional layer of complexity via emission in the visible range. The independent excitation requirements allowed individual tag compounds to contain both overt (visible) and covert (NIR) information revealed by different methods of interrogation, making the tag more difficult to counterfeit.

Next, the possibility of including unique lifetime signatures to create multilayer tags was examined. Time-domain PL lifetime measurements were performed on single, dimetal, and trimetal compositions. Metal identity and content had a measurable effect on fluorescence lifetimes of the compounds in the NIR region. To measure lifetimes in the NIR region, the ligand was excited at 337 nm using a N$_2$ laser, causing energy transfer to all RE centers in the MOF through the antenna effect, as depicted by the solid lines in FIG. 7A. Compound 10, which contained only Yb, exhibited biexponential decay with characteristic lifetimes ($\tau_1$ and $\tau_2$) of 1 µs and 5 µs, respectively. Compound 9, which contained only Nd, has an emission intensity too low for a lifetime to be measured. Compound 1, which contained both Nd and Yb, displayed biexponential decay with characteristic lifetimes of 0.86 µs and 2.9 µs. As a result of energy transfer from Nd to Yb, the NIR emission decayed faster in compound 1 than in compound 10.

The donor ligand TCPB emits from the Ti level in the near-UV region and thus has higher energy singlet and triplet energy levels than visible-emitting ligands. As a result, there is a large energy difference between the $^4F_{3/2}$-emitting level of Nd and the triplet state Ti of the TCPB. In addition, Nd has several higher-energy non-emitting levels to which the excitation energy can relax. The higher the concentration of Nd, the more important this relaxation mechanism becomes, weakening the emission strength and shortening the photoluminescent lifetime of the MOF. In contrast, the highest energy level of Yb is its emitting level, $^2F_{5/2}$. This difference between the properties of Nd and Yb helps explain why the compound 9 emission is much weaker than that of compound 10, when both are excited at 337 nm. The significant difference between the behavior of the two metals allows the properties of the heterometallic MOFs containing them to be tuned.

For trimetal samples (compounds 2, 6-8), decay was biexponential. The biexponential fits are plotted in FIG. 8. The characteristic lifetimes are closely related to the Eu content of the compounds. At low Eu contents, the decay curves were similar to those noted in compound 1 (with the dampening effect of Nd), while higher-Eu-content compounds showed decay profiles closer to that of the Yb single-metal composition, compound 10.

The addition of Eu (which is known to have a long emission lifetime) to the trimetal compounds had little effect on the lifetime of NIR emission at low doping levels, but higher levels of Eu led to a recovery of the original single-metal Yb lifetime. Additionally, non-radiative intermetallic energy transfer between the long-lived Eu centers and the Nd or Yb centers (shown by the dashed curves in FIG. 7A) allows the Nd and Yb emissions to continue for longer than they would alone, and dilution of the NIR-emitting metals with Eu also mitigates concentration-quenching effects. These results demonstrate that the influence of Eu content in the trimetal samples has a threshold effect rather than a continuum effect, producing two distinct lifetime decay profiles that depend on the inclusion of Nd and the exact level of Eu doping, both of which can be contributing factors for orthogonal identification.

PL lifetime decay in the visible range was measured using 390 nm excitation (which directly excites the Eu). PL decay in the visible range was affected by the interactions between the metal centers. Compound 11, containing only Eu, had a decay curve fitted by a single exponential equation and has a characteristic lifetime of 0.6 ms. Notably, compound 2, which contained all three metal centers, displayed a highly complex decay best fitted by the product of a power law $(1/t^{0.5})$ and a single exponential with a characteristic lifetime of 0.22 ms. Lifetime curves fitted to data in the visible range are compared in FIG. 8. Compound 11 has a long lifetime, on the scale of milliseconds, while compound 2 has a significantly faster initial decay. Despite the difference between these compounds, both had lifetimes much longer than those observed for the NIR-emitting compounds.

PL decay in the visible range was affected by the interactions between the metal centers. When the compounds were excited at 390 nm (which directly excites the Eu), the trimetal compound 2 had a faster and more complex decay behavior than the single-metal compound 11 (FIG. 8), because both Eu—Nd and Eu—Yb energy transfer affected the decay dynamics of compound 2. Under 337 nm excitation, the visible emission was significantly quenched as a result of the competing excitation mechanisms.

3-Factor Authentication of RE-TCPB-MOFs

Figure 8:
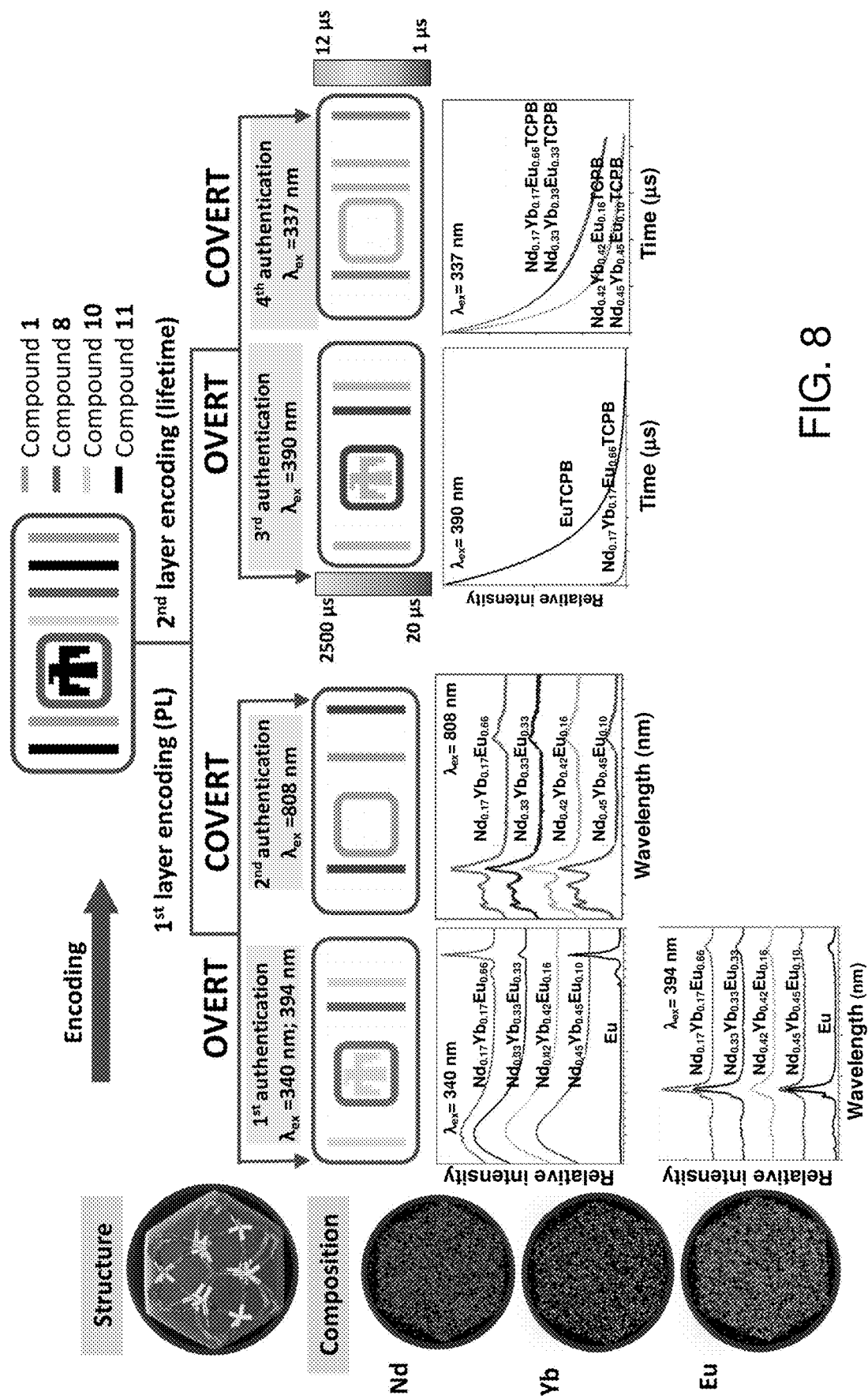
FIG. 8 shows examples of concomitant overt and covert authentication using RE-TCPB-MOF compounds, including NIR and visible emission spectra and corresponding fluorescence lifetime decays. Photophysical properties data are shown for compound 2 ($Nd_{0.33}Yb_{0.33}Eu_{0.33}$), compound 6 ($Nd_{0.45}Yb_{0.45}Eu_{0.10}$), compound 7 ($Nd_{0.42}Yb_{0.42}Eu_{0.16}$), compound 8 ($Nd_{0.17}Yb_{0.17}Eu_{0.66}$), and compound 11 (Eu).

A schematic depiction that portrays the multilayer complexity encoded in these materials and their unique attributes for tag authentication is shown in FIG. 8. For example, the different lifetimes of the compounds 2 and 11, combined with their similar emission spectra in the visible range, are an example of the utility of the heterometallic MOFs. Used together in a single tag, these two compounds would be indistinguishable from a spectral standpoint, but they could be easily differentiated based on their lifetime, even using relatively simple interrogation equipment. The emissions of compound 2 in the NIR would serve as an additional covert aspect of the tag.

The ability to detect the Eu-containing systems using standard laboratory equipment and tag visualization methods were also assessed. Using a standard plate reader, the fluorescence emission of compounds 2, 6, 7, 8 and 11 became visible. As expected from the emission spectra shown in FIG. 8, the fluorescent signal at 614 nm was related to the amount of Eu present in the sample. Even the MOF with the lowest Eu content, compound 6, had a signal 2 to 4-fold greater than background.

One unique property of Eu-containing materials is their long luminescent lifetime. Most fluorescent materials, including organic dyes and quantum dots, have lifetimes in the ns range. See N. Boens et al., *Anal. Chem.* 79(5), 2137 (2017); and S. Kalytchuk et al., *ACS Appl. Mater. Interfaces* 10(35), 29902 (2018). In contrast, compounds 8 and 11 have lifetimes in the μs range. While short lifetimes in the ns range can be measured with specialized equipment, longer lifetimes in the μs range can be visualized using many plate reader systems as delayed fluorescence capture.

Figure 9:
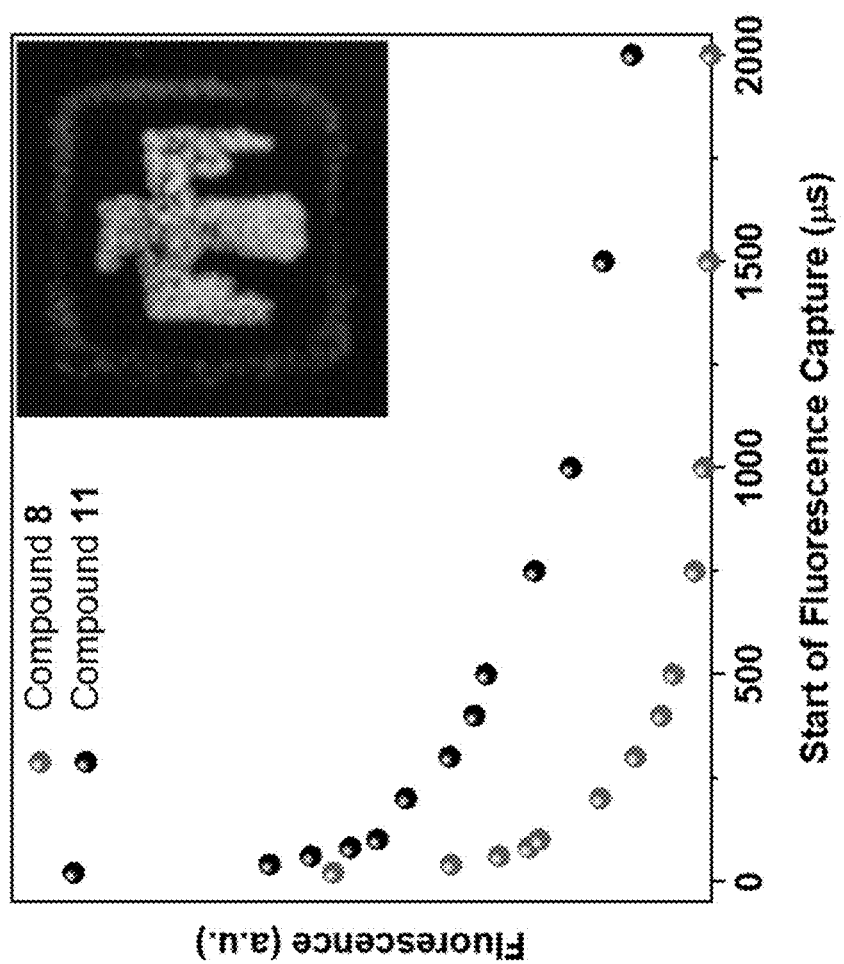
FIG. 9 shows a graph of delayed fluorescence measurements of compound 8 ($Nd_{0.17}Yb_{0.17}Eu_{0.66}$TCPB) and compound 11 (EuTCPB). Inset: Image of ink drawing of compound 8 (outer square) and 11 (bird image) on glass under 302 UV lamp excitation.

To investigate this potential use of compounds 8 and 11, the delayed fluorescence integrated over 20 μs was examined with collection initiated at times ranging from 20 to 2000 μs, as shown in FIG. 9. Both compounds displayed significant fluorescent signal (out to 500 μs), demonstrating that the differing photoluminescent lifetime properties can be used for material confirmation. As predicted from the photoluminescent lifetime curves, the EuTCPB sample was able to be detected out to 2000 μs post excitation.

Finally, the potential to use Eu containing MOFs as inks was tested. Compound 8 and 11 were formulated into ink and used to write or draw, as shown in FIG. 9, inset. Both the trimetal compound 8 and single Eu metal compound 11 inks were visible under UV lamp excitation.

Example: RE-MOFs with TBAP Linkers (RE-TBAP-MOFs)

As another example of the invention, RE-MOFs with a tetratopic linker, 1,3,6,8-tetrakis(4-carboxyphenyl)pyrene (TBAP), shown in FIG. 10A, were examined. TBAP has a lower energy triplet state and a more complex emission spectra than that of TCPB, but with a similar size and coordination chemistry to allow the synthesis of an isostructural materials platform. Specifically, mono-, di-, and trimetallic compositions displaying a wide range of PL properties were examined, with emission in both the visible and NIR ranges, facilitating the direct comparison with the above-described RE-MOFs using the TCPB linker.

These RE-TCPB-MOFs also serve as effective optical tags for identifying and validating high value items and materials. As before, a 3-factor authentication system can utilize orthogonal detection methods: (i) the metallic composition (Scanning Electron Microscopy/Energy Dispersive Spectroscopy and X-ray Fluorescensce), (ii) the PL emission spectrum (standard PL emission and plate reader fluorescence), and (iii) the PL decay dynamics (standard lifetime, as well as delayed fluorescence measurements).

To synthesize the RE-TCPB-MOFs, a reaction mixture was prepared containing the rare earth precursors, $Nd(NO_3)_3 \cdot 6H_2O$, $Yb(NO_3)_3 \cdot 5H_2O$, and/or $EuCl_3 \cdot 6H_2O$, 1,3,6,8-tetrakis(4-carboxyphenyl)pyrene (TBAP), and 2-fluorobenzoic acid (FBA) were added to a vial with dimethylformamide (DMF) and nitric acid. The vial was heated to 115° C. for over one hour, held at 115° C. for 48 hours, then cooled to room temperature. The resulting crystals were washed 3× with DMF then exchanged with methanol over 3 days, replenishing the methanol daily. The compositions of the various compounds synthesized are shown in Table 2.

TABLE 2

RE-TBAP-MOF compound designations and compositions.

| Compound | Composition |
|---|---|
| 12 | EuTBAP |
| 13 | $Nd_{0.05}Yb_{0.5}TBAP$ |
| 14 | $Eu_{0.77}Nd_{0.11}Yb_{0.12}TBAP$ |
| 15 | YbTBAP |

Structural Characterization of RE-TBAP-MOFs

Single crystal X-ray crystallography studies were used to gain detailed structural information about the compounds. To be noted, MOFs with related compositions based on the TBAP linker and nonanuclear (9M) RE clusters (Eu, as well as Tb and Y) were recently described. See X.-L. Lv et al., *J. Am. Chem. Soc.* 143, 2784 (2021); and V. Quezada-Novoa et al., *Chem. Mater.* 33, 4163 (2021). Unique to the materials synthesized as described herein was an 11-metal (11M) based cluster. The structures of compounds 12, 13, 14, and 15 were characterized and formulated by single crystal X-ray crystallography studies as: $(TBAP)_3$ $[(RE)_9$ ($\mu$-3 $OH)_{12}$ ($\mu$-3 $O)_2$ $(H_2O)_9]\cdot 1$ DMA·xFBA for the structures where 9M is dominant and $(TBAP)_3$ $[(RE)_{11}$ ($\mu$-3 $OH)_{12}$ ($\mu$-3 $O)_2$ $(H_2O)_9$ ($\mu$-2 $OH)_6]\cdot 1DMA\cdot xFBA$, for the structures where 11M is dominant, respectively.

As previously noted, the 9M cluster has a 60° rotational disorder about the c-axis that creates the appearance of an 18M cluster. See R. G. AbdulHalim et al., *J. Am. Chem. Soc.* 139, 10715 (2017). The carboxylic acid groups on the TBAP linker rotate to accommodate the two orientations of the cluster. This disorder has been previously noted. See X.-L. Lv et al., *J. Am. Chem. Soc.* 143, 2784 (2021); and V. Quezada-Novoa et al., *Chem. Mater.* 33, 4163 (2021). The rotational disorder of the 9M cluster causes positional overlap of metal atoms in one configuration with oxygen atoms in the other configuration.

Initial observations of the dimetallic NdYbTBAP structure, compound 13, showed significant electron density above and below the 9M cluster, shown in FIG. 10B, and subsequently identified as the 10th and 11th metals in the cluster, shown in FIG. 10C. The 11M cluster builds upon the structure of the 9M cluster with the additional two metal atoms coordinating to the above and below capping $H_2O$ molecules. The 9M and 11M clusters coexist in the structure; the apical density was modeled as an 11M cluster, while the occupancy of each position was refined using a free variable (FVAR), using a separate FVAR to refine partial occupancy. The value of the FVAR is what provides the estimate occurrence of %11M clusters. In the dimetallic NdYbTBAP structure, compound 13, the occupancy of the apical positions refined to 34%.

Interestingly, for the monometallic Eu-based compound 12, the electron density observed above and below the 9M cluster was very low. The occupancy of the apical positions refined to only 4%, indicating that the structure is overwhelmingly composed of 9M clusters. To investigate whether the occurrence of the 11M is noticeable in a monometallic composition comprised of a heavier RE, the composition of the monometallic Yb analogue, compound 15, was targeted for comparison. The electron density in the apical positions was refined to 38%, suggesting a large fraction of 11M clusters present in the structure. Finally, in the trimetallic EuNdYb composition, compound 14, the occupancy was refined to be 16%, consistent with the high concentration of Eu, which favors a 9M configuration.

Figure 11:
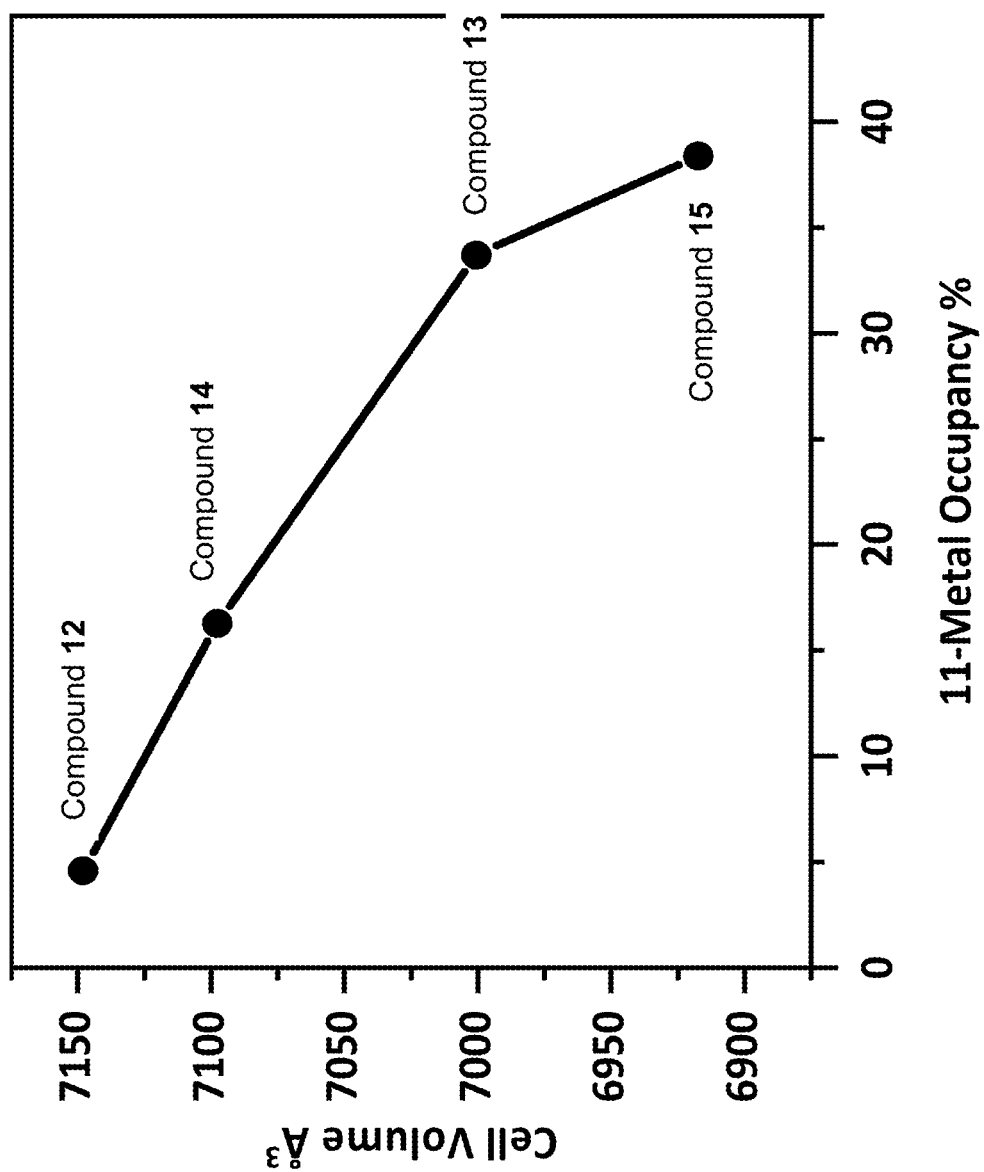
FIG. 11 is a graph demonstrating the effect of the 11M occurrence on the unit cell volume.

The effect of 11M clusters, linked to Yb, on the unit cell volume is significant, as shown in FIG. 11. This is underscored by the considerable contraction in unit cell volume for the monometallic Yb structure (Compound 15), which breaks the linear trend. The presence of an 11M cluster is lowest in the monometallic Eu structure (~4%, Compound 12) and highest in the monometallic Yb structure (~38%, Compound 15).

Figure 12:
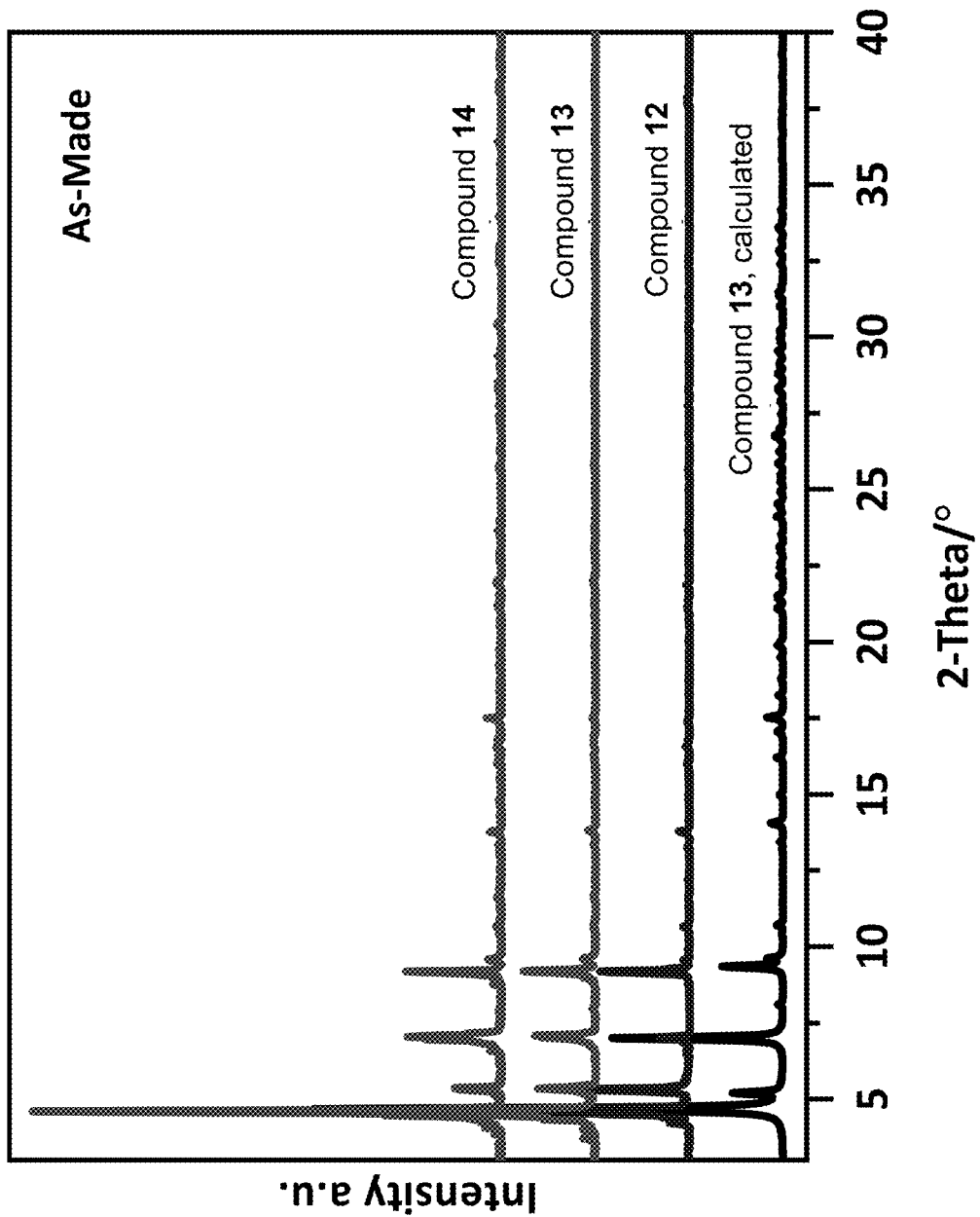
FIG. 12 is a graph of powder X-ray diffraction (PXRD) patterns showing the crystallinity and isostructural nature of as-made samples.

Powder X-ray diffraction (PXRD) studies confirmed the phase purity of the materials, as indicated by the excellent correlation between the calculated and experimental patterns, shown in FIG. 12. Further, after solvent exchange with MeOH, followed by guest removal via heating to 120° C. for 12 hours (activation), the crystal structure was fully preserved, as demonstrated by post activation PXRD patterns (not shown).

Figure 13:
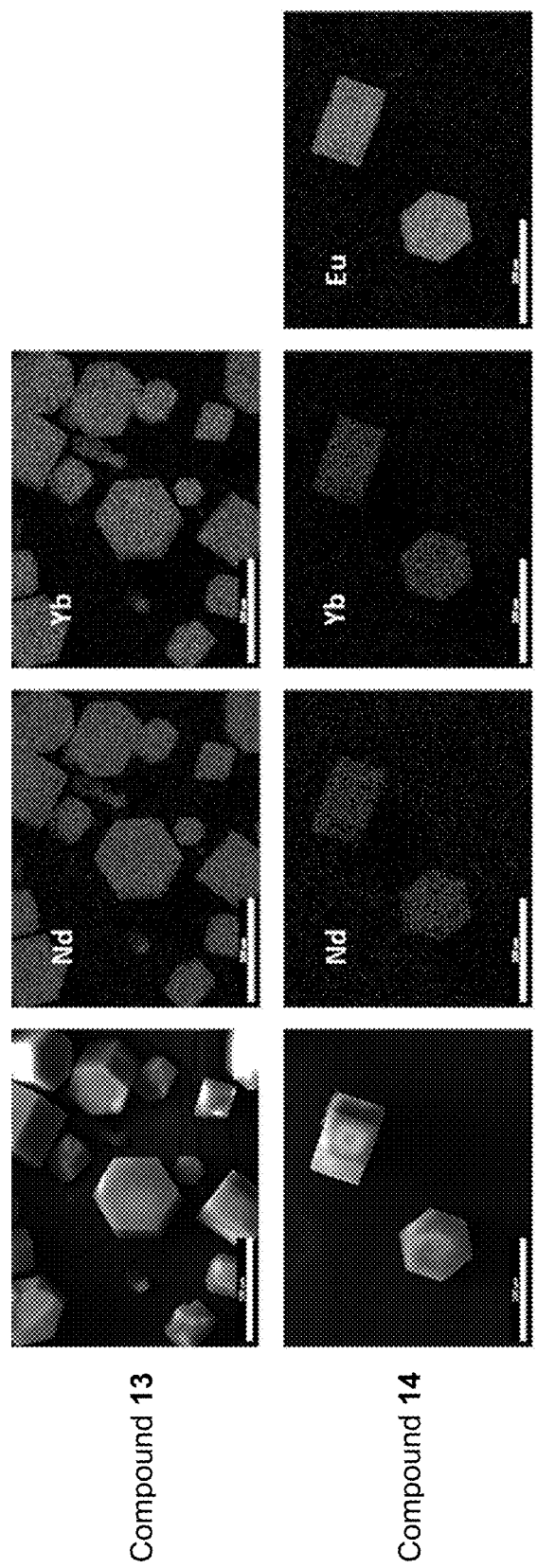
FIG. 13 shows SEM images and EDS maps for the dimetal (compound 13) and trimetal (compound 14) compositions showing particle morphology and the uniform distribution of metals within individual crystals. All scale bars are 100 μm.

Crystal morphology and composition were probed using scanning electron microscopy (SEM) and electron dispersive X-ray spectroscopy (EDS). The composition and elemental distribution of each multi-metal material was determined by EDS are shown in Table 2 and FIG. 13, respectively. EDS mapping confirmed that the elements were uniformly distributed throughout each crystal. The use of a high concentration of Eu relative to Nd and Yb in compound 14 was chosen to highlight the effects of diluting the NIR emitting metals, as well as to match and facilitate direct comparison to the TCPB-based related MOFs.

$N_2$ Sorption Measurements of RE-TBAP-MOFs

Figure 14:
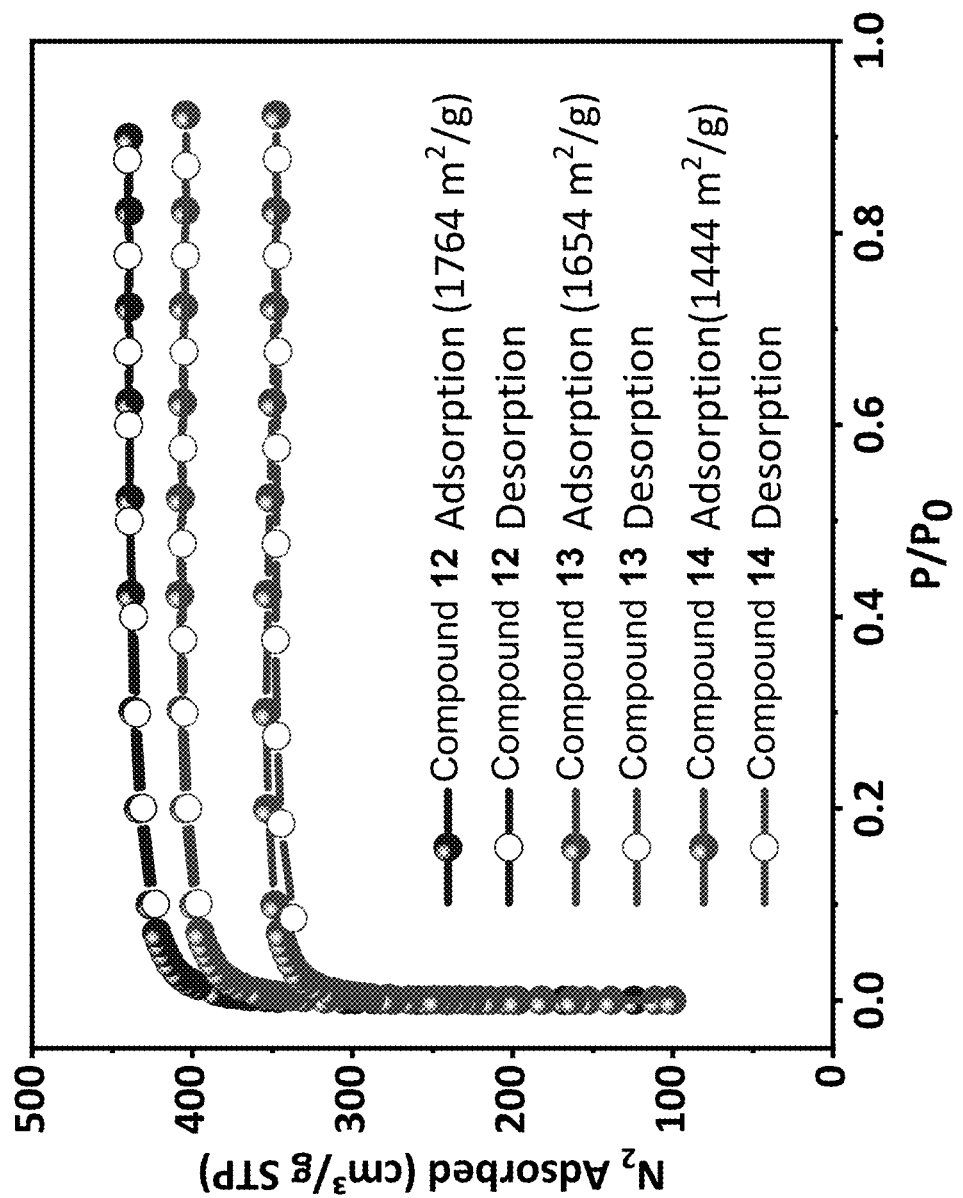
FIG. 14 is a graph of nitrogen adsorption (closed circles) and desorption (open circles) isotherms measured at 77K for compounds 12, 13, and 14.

To probe the porosity features in these materials, nitrogen adsorption isotherms were measured at 77K and are displayed in FIG. 14. The calculated BET specific surface areas were 1764 $m^2$/g for compound 12, 1654 $m^2$/g for compound 13, and 1444 $m^2$/g for compound 14. The large surface area and pore size provide excellent avenues for further PL properties alterations, sensing, or post-synthetic modification through guest molecules incorporation.

Photophysical Properties Evaluation of RE-TBAP-MOFs

In order to demonstrate the effects of different organic linker structures on the photoluminescence emission spectra of the RE-MOFs, the optical properties of the TBAP linker were examined in relation to the similarly structured TCPB linker. An estimate of the linker's triplet excited state energy is required to determine how it will interact with the metals surrounding it, whether it will donate energy and excite the metal or not. The triplet state can be determined from the highest energy edge of its photoluminescent emission peak. See J. Wang et al., *CrystEngComm* 23, 100 (2021); and M. Shi et al., *Inorg. Chem.* 44, 8929 (2005). Based its primary emission peak at 544 nm, the triplet state of TBAP was estimated to be 18,500 $cm^{-1}$. In comparison, the TCPB linker's primary emission peak at 405 nm yields a higher estimated triplet state energy of approximately 26,500 $cm^{-1}$. Because of this difference in energetics, both TBAP and the specific metal compositions of each MOF were chosen to facilitate direct comparison to the related MOFs made using the TCPB linker.

After examining the properties of the linker, the PL spectrum of each MOF was examined with the results displayed alongside the linker for comparison in FIGS. 15A and 15B. In addition, the role of guest molecules in the framework was examined via measuring PL spectra for both the as-synthesized MOFs and guest free (activated) MOFs (FIGS. 15A and 15B, respectively).

The linker emission peak is asymmetric, with a shoulder at 575 nm, FIGS. 15A and 15B, black trace. When the linker is incorporated into the MOF and excited at 337 nm, the emission peak associated with the linker is blue shifted, as shown in FIG. 15A. This shift reflects the rigidity of the MOF preventing the dissipation of energy, as well as the spatial separation of the linkers within the structure reducing interactions between nearby linkers, a phenomenon observed in related systems. See Z. Wei et al., *J. Am. Chem. Soc.* 136, 8269 (2014); N. B. Shustova et al., *J. Am. Chem. Soc.* 133, 20126 (2011); and N. B. Shustova et al., *J. Am. Chem. Soc.* 134, 19596 (2012). The shoulder is also more pronounced, essentially resolving into two peaks centered at 445 nm and 485 nm, as shown for Compounds 12, 13, and 14 in FIG. 15A. Pyrene is known to have a spectrum made up of several fluorescence bands, some of which are sensitive to the polarity of solvent molecules near them. See G. K. Bains et al., *Biochem.* 51, 6207 (2012). Within MOFs, changes of emission spectra and emergence of new peaks for both TBAP and other linkers depending on guest molecules has also been observed. See K. C. Stylianou et al., *J. Am. Chem. Soc.* 132, 4119 (2010); and E. Y. Lee et al., *J. Am. Chem. Soc.* 127, 6374 (2005). In addition, pyrene and some of its derivatives are also known to form excimers through the interactions of nearby excited and ground state groups, creating additional emission peaks depending on the energy of the excimer complex. See G. K. Bains et al., *Biochem.* 51, 6207 (2012); and A. Wrona-Piotrowicz et al., *RSC Adv.* 4, 56003 (2014). Both guest-related and excimer-related phenomena are possible within the framework reported here, as evidenced by the shifting of peaks with methanol removal without fully suppressing the presence of multiple emission peaks.

In the TBAP-based MOFs, when the linker is excited at 337 nm, no peaks associated with Eu emissions were observed for the MOFs that contained Eu. This is in stark contrast to the previous TCPB MOFs. In addition, no Eu emission was observed when the metal was excited directly at 394 nm because of the linker absorption also at that wavelength. The lack of Eu related emissions from ligand-to-metal transfer indicates inefficient energy transfer and/or back transfer of energy between the linker and the metal centers. Reinholdt and Latva's empirical rules suggest that an energy gap of at least 5000 $cm^{-1}$ between the linker singlet and triplet state is necessary for efficient intersystem crossing, while a gap of at least 1850-3500 $cm^{-1}$ between the linker triplet state and the metal's excited state is required for quick energy transfer between the linker and the metal without energy lost to back-transfer. See M. Latva et al., *J. Lumin.* 75, 149 (1997); and F. J. Steemers et al., *J. Am. Chem. Soc.* 117, 9408 (1995). Based on these rules the gap between the linker triplet state (~18,500 $cm^{-1}$) and the $^5D_0$ level of Eu (17,500 $cm^{-1}$)[25] is too narrow, resulting in inefficient energy transfer between the linker and the metal clusters. In addition, the linker absorbs in the same wavelength range as the Eu itself, competing for direct excitation with the metal. These conditions have the effect of suppressing the Eu emission peaks in the MOF spectra, even when Eu is excited directly. Therefore, the TCPB-based MOFs efficiently excite Eu but TBAP-based MOFs fail to do so.

Latva et al. observed a similar trend when examining Eu and Tb chelates, showing that the quantum yield of Tb chelates dropped significantly as the ligand triplet state energy approached the lowest excited state of Tb. See M. Latva et al., *J. Lumin.* 75, 149 (1997). The same ligands gave high quantum yield when chelated with Eu, which has a lower energy excited state than Tb. In MOFs this effect was observed for Sm, which was prevented from fluorescing by selecting a linker with a triplet state too close to the excited state of Sm. See Y. Ou et al., *Angew. Chem. Int. Ed.* (2020). Similarly, visible emissions from Eu are masked while retaining emissions from NIR emitters in the framework.

To examine emission in the NIR, the Nd metal clusters were excited directly using 808 nm light. The resulting spectra are shown in FIG. 15C. These spectra contain peaks at 1050 and 1320 nm corresponding to the $^4F_{3/2}$ to $^4I_{11/2}$ and $^4F_{3/2}$ to $^4I_{13/2}$ transitions in Nd respectively, and a set of peaks around 1000 nm corresponding to the $^2F_{5/2}$ to $^2F_{7/2}$ transition in Yb. The presence of Yb emission peaks indicates a transfer of energy between excited Nd ions and nearby Yb ions. The excited states of Nd and Yb are significantly lower in energy compared to those of the linker and Eu and are, as expected, thus not prone to energy loss through back transfer or competition for absorption wavelengths. Although Eu is not excited at 808 nm it does affect the spectra of the NIR emitters. The peaks in the trimetal sample are less defined than in the dimetal sample, an anticipated consequence of the high Eu content of the trimetal MOF diluting the emitting Nd and Yb ions. No significant change in the spectrum was observed after guest removal, indicating that the metal emissions are not guest dependent as those associated with the linker.

Figure 16:
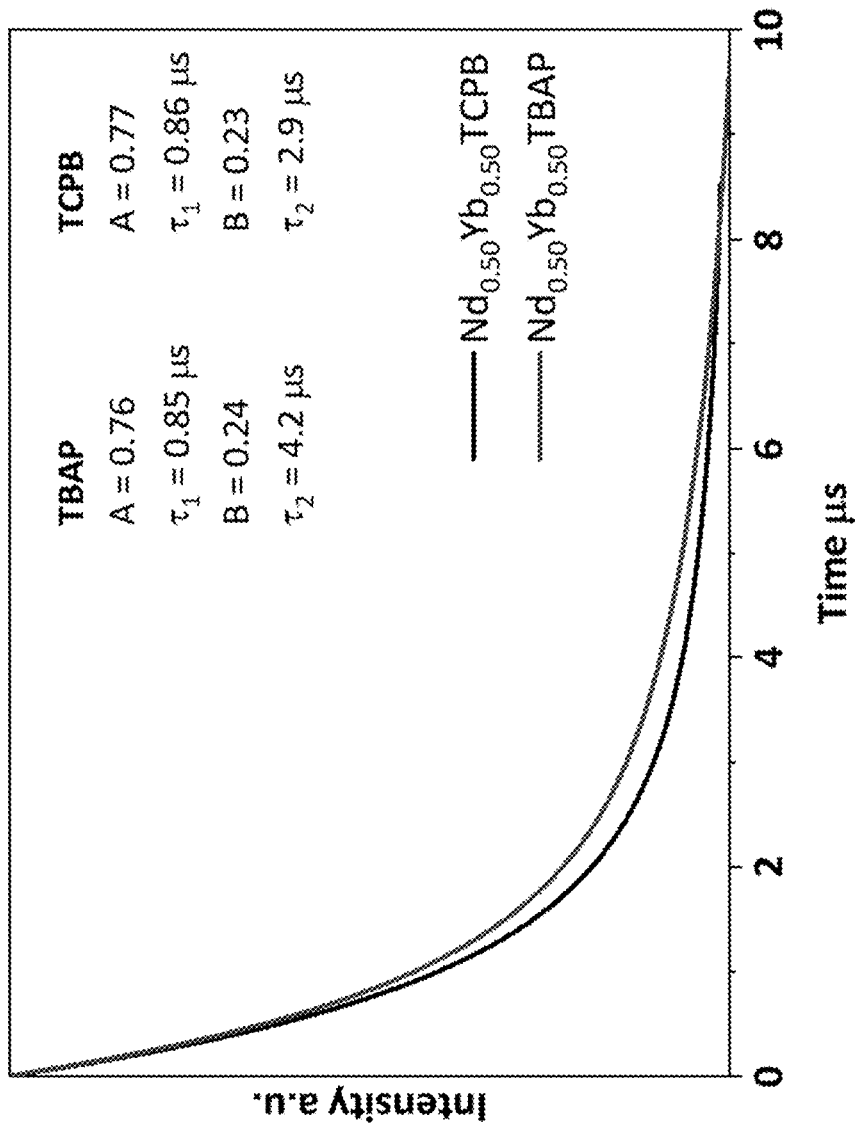
FIG. 16 is a graphic comparison of fluorescence lifetime fits and fit parameters for TCPB- and TBAP-based MOFs in the NIR region, highlighting related decay profiles.

Fluorescence lifetimes in the visible range were too short and dim to measure, an expected consequence of the lack of Eu emission peaks. In the NIR the fluorescence was examined using an excitation wavelength of 337 nm, targeting activation of the linker. The lifetimes and biexponential fit parameters for TBAP and TCPB MOFs with similar compositions are shown in FIG. 16. The presence of NIR emissions when the linker is excited indicates that the triplet state of the linker is sufficiently higher than the excited states of the NIR emitting metals for energy transfer to remain efficient, unlike what was observed for Eu. The lifetime was measurable for the dimetal TBAP MOF and was similar to previously reported lifetimes for the dimetal TCPB, suggesting that both linkers are equally capable of transferring energy to the NIR emitters despite their differences regarding Eu. This lack of change between the two framework lifetimes also suggests that the presence of 11-metal clusters in the TBAP structure has no discernible effect on the lifetime of fluorescence in the NIR. The trimetal sample's lifetime was not measurable in the NIR, a consequence of the relatively low content of NIR emitters relative to Eu in that sample, reducing the overall brightness in the NIR.

3-Factor Authentication of RE-TBAP-MOFs Compared to RE-TCPB-MOFs

The in-depth characterization of the MOF materials highlights their utility as optical tags, allowing the use of orthogonal detection methodologies, in this case 3-factor authentication, across both overt and covert regimes. Below, complementary characterization techniques for tag validation are demonstrated using easily accessible, standard laboratory equipment.

First, the ability to identify the elemental composition was performed using a hand-held XRF system. The results of this characterization showed clear qualitative differentiation between compounds 12 and 14 through their metallic composition. Next, using a standard plate reader, compounds 12 and 14 were compared to Eu single metal and trimetal counterparts made with TCPB. When excited with a wavelength of 337 and the fluorescence emission collected at 400 nm, only TCPB-containing MOFs exhibited fluorescence, consistent with the emission of the TCPB linker. In contrast, when the emission was collected at 500 nm, only the TBAP-containing MOFs gave significant signal, as expected from the emission spectra of the TBAP-containing MOFs.

Next, the use of the TBAP linker to efficiently conceal the Eu signature from detection via a standard plate reader was assessed. As predicted from the linker energetics, when excited with 337 nm wavelength, the emission at 617 nm was readily visible with the TCPB-containing single metal and trimetal RE-MOFs but was not visible with the TBAP-containing RE-MOFs. As described above, the fluorescence lifetime in the visible range of the TCPB Eu-containing RE-MOFs resulted in a sustained fluorescent signature from the Eu when excited at 337 nm. This signature could be visualized as delayed fluorescence collected after the removal of the excitation for microseconds with the strength of the signal related to the amount of Eu present in the RE-MOF. The use of the TBAP linker resulted in the loss of the fluorescent lifetime in the visible range due to the loss of the energy transfer to Eu. As expected from the loss of the visible fluorescence lifetime, when delayed fluorescence of the TBAP and corresponding TCPB samples was assessed only the TCPB samples were visible when excited at 337 nm.

Figure 17:
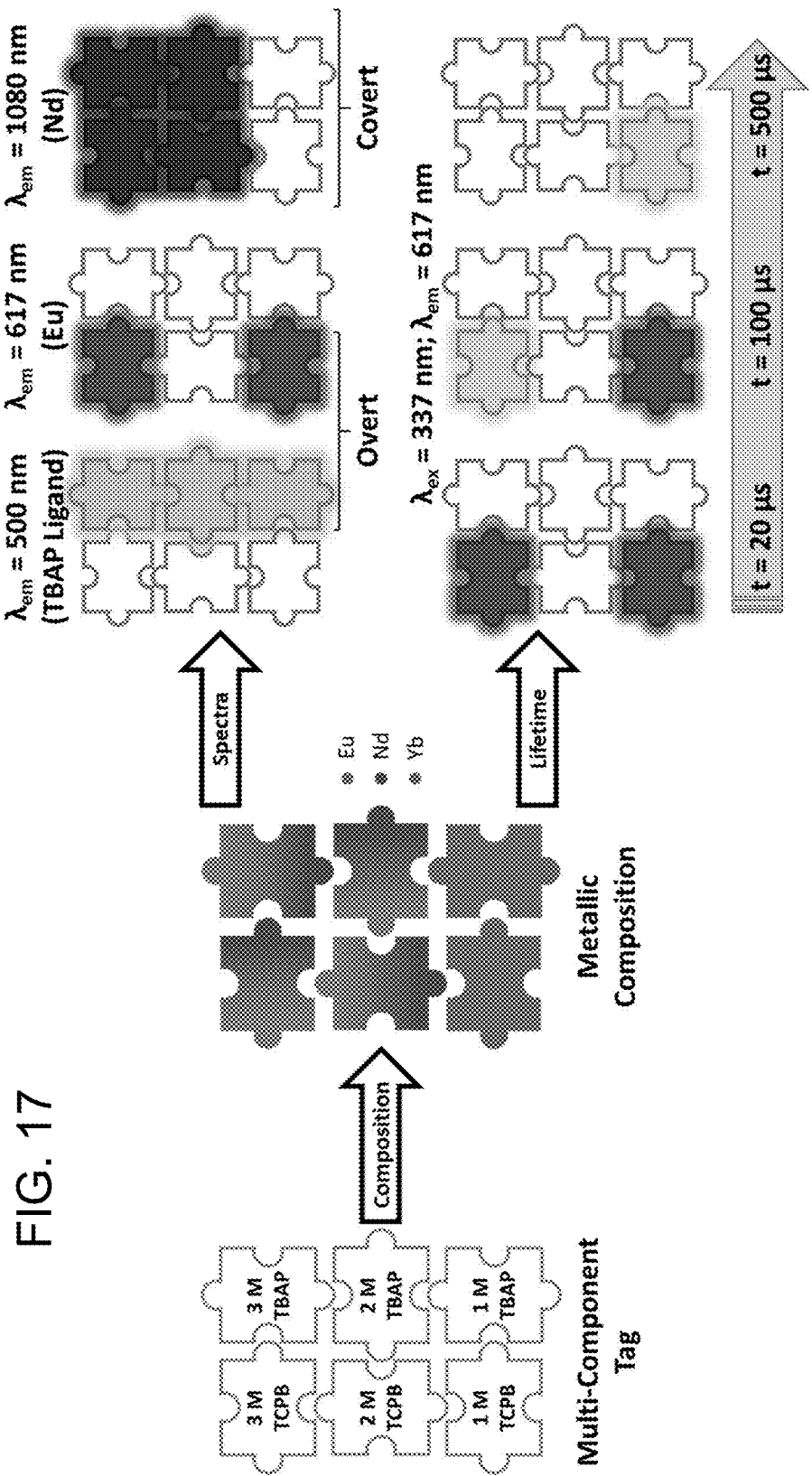
FIG. 17 is a schematic representation of the differing properties of RE-MOFs based on the TCPB and TBAP linkers, highlighting the effects of differing linker energetics on the resulting optical properties of the MOFs, and their utility in creating complex, orthogonal signals for identification. 1M, 2M, and 3M represent respectively the compositions of compound 12, compound 13, and compound 14, respectively.

Taken together, the materials can be used to create complex combinations of properties to serve as highly intricate optical tags. At least three methods of encoding across both overt and covert domains, along with the corresponding authentication methodologies pertinent to both rapid and conventional characterization techniques have been identified and are shown schematically in FIG. 17.

The present invention has been described as optical tags comprising rare earth metal-organic frameworks. It will be understood that the above description is merely illustrative of the applications of the principles of the present invention, the scope of which is to be determined by the claims viewed in light of the specification. Other variants and modifications of the invention will be apparent to those of skill in the art.

We claim:

1. An optical tag comprising a rare earth metal-organic framework, wherein the rare earth metal-organic framework comprises two or more different rare earth metals arranged in polynuclear metal clusters connected by carboxylic acid-based linkers.

2. The optical tag of claim 1, wherein the two or more different rare earth metals are selected from the group consisting of Nd, Yb, Eu, Y, Ce, Pr, Sm, Gd, Tb, Dy, Ho, Er, and Tm.

3. The optical tag of claim 1, wherein the carboxylic acid comprises a di-, tri-, tetra-, or hexacarboxylic acid.

4. The optical tag of claim 3, wherein the dicarboxylic acid comprises 4, 4'-stilbenedicarboxylic acid, 2,2'-Dinitro-4,4'-stilbenedicarboxylic acid, 2'2-Diamino-4,4'-stilbenedicarboxylic acid, 2,5-Dihydroxyterephthalic acid, 4,4'-biphenyl dicarboxylic acid, or 1,4-napthalene dicarboxylic acid.

5. The optical tag of claim 3, wherein the tricarboxylic acid comprises 1,3,5-Tris(4-carboxyphenyl)benzene, 4,4', 4"-5-Triazine-2,4,6-triyl-tribenzoic acid, or 1,3,5-Tris(4'-carboxy[1,1'-biphenyl]-4-yl)benzene.

6. The optical tag of claim 3, wherein the tetracarboxylic acid comprises 1,2,4,5-Tetrakis(4-carboxyphenyl)benzene, or 1,3,6,8-Tetra(4/carboxyphenyl)pyrene.

7. The optical tag of claim 3, wherein the hexacarboxylic acid linker comprises 1,2,3,4,5,6-hexakis(4'-carboxylato(1, 1'-biphenyl)-4-yl)benzene.

8. The optical tag of claim 1, wherein the optical tag has both overt (visible) and covert (near infrared) optical emission signatures.

9. The optical tag of claim 8, wherein a wavelength range of the covert (near infrared) optical emission signature is from 950 to 1450 nm.

10. The optical tag of claim 1, wherein the polynuclear metal clusters comprise hexanuclear or nonanuclear metal clusters.

11. A method to identify or track an object, comprising;
associating an optical tag comprising a rare earth metal-organic framework with the object, wherein the rare earth metal-organic framework comprises two or more different rare earth metals arranged in polynuclear metal clusters connected by carboxylic acid-based linkers, and
interrogating at least one encoding property of the optical tag in order to authenticate the object.

12. The method of claim 11, wherein the at least one encoding property comprises a unique optical emission signature, a unique fluorescence lifetime decay signature, or a compositional or structural property.

13. The method of claim 11, wherein, wherein the at least one encoding property comprises an overt optical emission in the visible range and/or a covert optical emission signature in the near-infrared range and the interrogating comprises exciting the overt and/or covert optical emissions with one or more optical excitation sources.

14. The optical tag of claim 13, wherein the near-infrared range of the covert optical emission signature is from 950 to 1450 nm.

15. The method of claim 13, wherein the overt optical emission is excited by an optical excitation source at a first wavelength and the covert optical emission is excited by an optical excitation source at a second wavelength.

16. The method of claim 11, wherein the step of interrogating comprises interrogating at least two encoding properties of the optical tag.

17. The method of claim 11, wherein the step of associating comprises printing an ink containing the optical tag on the object.

18. The method of claim 11, wherein the two or more different rare earth metals are selected from the group consisting of Nd, Yb, Eu, Y, Ce, Pr, Sm, Gd, Tb, Dy, Ho, Er, and Tm.

19. The method of claim 11, wherein the carboxylic acid comprises a di-, tri-, tetra-, or hexacarboxylic acid.

20. The method of claim 19, wherein the dicarboxylic acid comprises 4, 4'-stilbenedicarboxylic acid, 2,2'-Dinitro-4,4'-stilbenedicarboxylic acid, 2'2-Diamino-4,4'-stilbenedicarboxylic acid, 2,5-Dihydroxyterephthalic acid, 4,4'-biphenyl dicarboxylic acid, or 1,4-napthalene dicarboxylic acid.

21. The method of claim 19, wherein the tricarboxylic acid comprises 1,3,5-Tris(4-carboxyphenyl)benzene, 4,4', 4"-5-Triazine-2,4,6-triyl-tribenzoic acid, or 1,3,5-Tris(4'-carboxy[1,1'-biphenyl]-4-yl)benzene.

22. The method of claim 19, wherein the tetracarboxylic acid comprises 1,2,4,5-Tetrakis(4-carboxyphenyl)benzene, or 1,3,6,8-Tetra(4/carboxyphenyl)pyrene.

23. The method of claim 19, wherein the hexacarboxylic acid comprises 1,2,3,4,5,6-hexakis(4'-carboxylato(1,1'-biphenyl)-4-yl)benzene.

24. The method of claim 11, wherein the polynuclear metal clusters comprise hexanuclear or nonanuclear metal clusters.

* * * * *